(12) United States Patent
Kamon et al.

(10) Patent No.: US 12,647,044 B2
(45) Date of Patent: Jun. 2, 2026

(54) POWER CONVERTER AND CONTROL METHOD

(71) Applicant: Panasonic Intellectual Property Management Co., Ltd., Osaka (JP)

(72) Inventors: Yutaka Kamon, Osaka (JP); Koji Higashiyama, Osaka (JP); Yasuhiro Arai, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 184 days.

(21) Appl. No.: 18/702,716

(22) PCT Filed: Oct. 24, 2022

(86) PCT No.: PCT/JP2022/039571
§ 371 (c)(1),
(2) Date: Apr. 18, 2024

(87) PCT Pub. No.: WO2023/074636
PCT Pub. Date: May 4, 2023

(65) Prior Publication Data
US 2024/0413764 A1 Dec. 12, 2024

(30) Foreign Application Priority Data
Oct. 26, 2021 (JP) ................................. 2021-175013

(51) Int. Cl.
*H02M 7/48* (2007.01)
*H02M 1/00* (2006.01)
*H02M 7/5395* (2006.01)

(52) U.S. Cl.
CPC ....... *H02M 7/4818* (2021.05); *H02M 1/0058* (2021.05); *H02M 7/48* (2013.01); *H02M 7/5395* (2013.01)

(58) Field of Classification Search
CPC .... H02M 7/4818; H02M 1/0058; H02M 7/48; H02M 7/5395
See application file for complete search history.

(56) References Cited

U.S. PATENT DOCUMENTS

| | | | |
|---|---|---|---|
| 5,574,636 A | 11/1996 | Lee et al. | |
| 6,341,078 B1 * | 1/2002 | Miller ................. | H02M 7/5387 363/17 |

(Continued)

FOREIGN PATENT DOCUMENTS

| | | |
|---|---|---|
| JP | H10-505218 A | 5/1998 |
| JP | 2000-308360 A | 11/2000 |

(Continued)

OTHER PUBLICATIONS

International Search Report dated Jan. 10, 2023 issued in International Patent Application No. PCT/JP2022/039571, with English translation.

*Primary Examiner* — Lakaisha Jackson
(74) *Attorney, Agent, or Firm* — Rimon P.C.

(57) ABSTRACT

In a power converter, a plurality of resonant capacitors are provided one to one for a plurality of switches, respectively. Each of the plurality of resonant capacitors is connected between a first terminal of a corresponding one of the plurality of switches and a second DC terminal. A controller controls a plurality of first switching elements, a plurality of second switching elements, and the plurality of switches. When determining that two-phase resonant currents corresponding to two switching circuits belonging to a plurality of switching circuits flow simultaneously through a resonant inductor, the controller performs control of shifting respective ON periods of the first switching element and the second switching element in one switching circuit out of the two switching circuits.

12 Claims, 25 Drawing Sheets

FIG. 1

(56)                    References Cited

U.S. PATENT DOCUMENTS

| | | | | |
|---|---|---|---|---|
| 8,212,506 | B2 * | 7/2012 | Iwahori | .................. B60L 50/13 |
| | | | | 318/148 |
| 9,461,556 | B2 * | 10/2016 | Flett | .................... H02M 5/4585 |
| 2013/0002186 | A1 * | 1/2013 | Iwahori | .............. H02M 5/4585 |
| | | | | 318/722 |

FOREIGN PATENT DOCUMENTS

| | | | |
|---|---|---|---|
| JP | 2010-141952 | A | 6/2010 |
| JP | 2010-233306 | A | 10/2010 |
| JP | 2011-078204 | A | 4/2011 |
| WO | 96/08072 | A1 | 3/1996 |

* cited by examiner

POWER CONVERTER AND CONTROL METHOD

This application is the U.S. National Phase under 35 U.S.C. § 371 of International Patent Application No. PCT/ JP2022/039571, filed on Oct. 24, 2022, which in turn claims the benefit of Japanese Patent Application No. 2021-175013, filed on Oct. 26, 2021, the entire disclosures of which Applications are incorporated by reference herein.

TECHNICAL FIELD

The present disclosure generally relates to a power converter and a control method. More particularly, the present disclosure relates to a power converter having the ability to convert DC power into AC power and a method for controlling such a power converter.

BACKGROUND ART

Patent Literature 1 discloses a power converter for converting DC power into multiphase AC power.

The power converter of Patent Literature 1 includes a main switching means (power converter circuit), two capacitors, one coil (resonant inductor), a plurality of auxiliary switch elements, and a control means. The main switching means includes a plurality of main switching circuits provided for respective phases of the multiphase AC power. Each of the plurality of main switching circuits is implemented as a pair of main switch elements which are connected in series between both terminals of a DC power supply and uses, as the output node of its associated phase, the interconnection node of the pair of main switch elements. The two capacitors divide the voltage of the DC power supply. One terminal of the coil is connected to a voltage division node of the two capacitors. The plurality of auxiliary switch elements connect the other terminal of the coil and the output nodes of the respective phases. When determining that a plurality of phase currents flow through the coil, the control means controls the plurality of auxiliary switch elements to make the amount of current flowing through at least one phase smaller than a preset amount.

In the power converter of Patent Literature 1, when determining that a plurality of phase currents flow through the coil, the control means controls the plurality of auxiliary switch elements to make the amount of current flowing through at least one phase smaller than a preset amount. Thus, the power converter does not make soft switching of a main switch corresponding to the at least one phase.

CITATION LIST

Patent Literature

Patent Literature 1: JP 2010-233306 A

SUMMARY OF INVENTION

An object of the present disclosure is to provide a power converter and control method that enables making soft switching with more reliability.

A power converter according to an aspect of the present disclosure includes a first DC terminal and a second DC terminal, a power converter circuit, a plurality of AC terminals, a plurality of switches, a plurality of resonant capacitors, a resonant inductor, a capacitor, and a controller. The power converter circuit includes a plurality of first switching elements and a plurality of second switching elements. In the power converter circuit, a plurality of switching circuits, in each of which one of the plurality of first switching elements and a corresponding one of the plurality of second switching elements are connected one to one in series, are connected in parallel. In the power converter circuit, the plurality of first switching elements are connected to the first DC terminal and the plurality of second switching elements are connected to the second DC terminal. The plurality of AC terminals are provided one to one for the plurality of switching circuits, respectively. Each of the plurality of AC terminals is connected to a connection node between the first switching element and the second switching element of a corresponding one of the plurality of switching circuits. The plurality of switches are provided one to one for the plurality of switching circuits. Each of the plurality of switches has a first terminal thereof connected to the connection node between the first switching element and the second switching element of a corresponding one of the plurality of switching circuits. The plurality of switches have their respective second terminals connected in common to a common connection node. The plurality of resonant capacitors are provided one to one for the plurality of switches, respectively. Each of the plurality of resonant capacitors is connected between the first terminal of a corresponding one of the plurality of switches and the second DC terminal. The resonant inductor has a first terminal and a second terminal. In the resonant inductor, the first terminal of the resonant inductor is connected to the common connection node. The capacitor is connected between the second terminal of the resonant inductor and the second DC terminal. The controller controls the plurality of first switching elements, the plurality of second switching elements, and the plurality of switches. When determining that two-phase resonant currents corresponding to two switching circuits belonging to the plurality of switching circuits flow simultaneously through the resonant inductor, the controller performs control of shifting respective ON periods of the first switching element and the second switching element in one switching circuit out of the two switching circuits.

A control method according to another aspect of the present disclosure is a method for controlling a power converter. The power converter includes a first DC terminal and a second DC terminal, a power converter circuit, a plurality of AC terminals, a plurality of switches, a plurality of resonant capacitors, a resonant inductor, and a capacitor. The power converter circuit includes a plurality of first switching elements and a plurality of second switching elements. In the power converter circuit, a plurality of switching circuits, in each of which one of the plurality of first switching elements and a corresponding one of the plurality of second switching elements are connected one to one in series, are connected in parallel. In the power converter circuit, the plurality of first switching elements are connected to the first DC terminal and the plurality of second switching elements are connected to the second DC terminal. The plurality of AC terminals are provided one to one for the plurality of switching circuits, respectively. Each of the plurality of AC terminals is connected to a connection node between the first switching element and the second switching element of a corresponding one of the plurality of switching circuits. The plurality of switches are provided one to one for the plurality of switching circuits. Each of the plurality of switches has a first terminal thereof connected to the connection node between the first switching element and the second switching element of a corresponding one of the plurality of switching circuits. The plurality of switches have their respective second terminals connected in common to a common connection node. The plurality of resonant capacitors are provided one to one for the plurality of switches, respectively. Each of the plurality of resonant capacitors is connected between the first terminal of a corresponding one of the plurality of switches and the second DC terminal. The resonant inductor has a first terminal and a second terminal. In the resonant inductor, the first terminal of the resonant inductor is connected to the common connection node. The capacitor is connected between the second terminal of the resonant inductor and the second DC terminal. The control method includes a first step and a second step. The first step includes determining whether two-phase resonant currents corresponding to two switching circuits belonging to the plurality of switching circuits flow simultaneously through the resonant inductor. The second step includes performing, when determining, in the first step, that the two-phase resonant currents flow simultaneously through the resonant inductor, control of shifting respective ON periods of the first switching element and the second switching element in one switching circuit out of the two switching circuits.

DESCRIPTION OF EMBODIMENTS

First Embodiment

Figure 1:
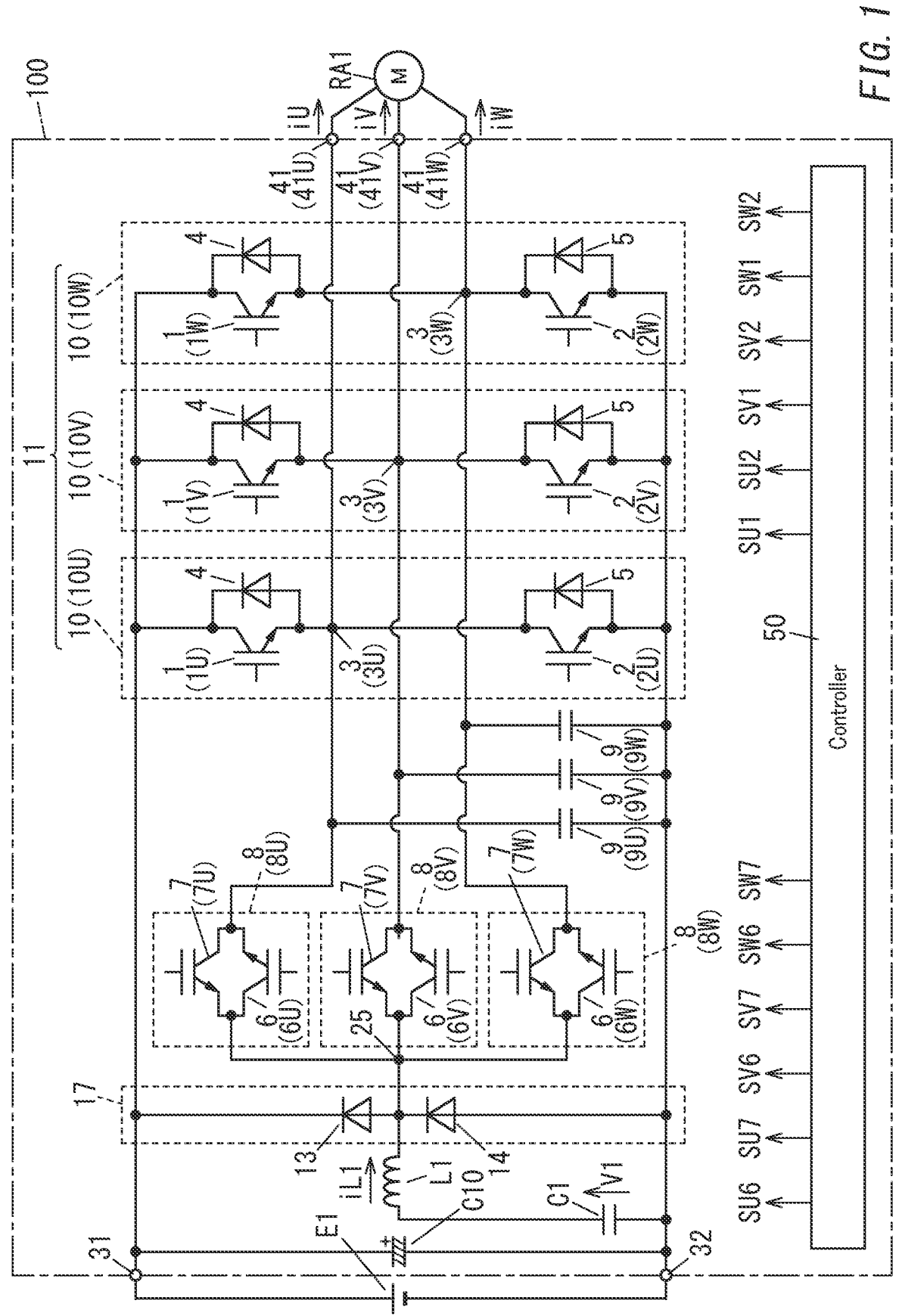
FIG. 1 is a circuit diagram of a system including a power converter according to a first embodiment.

A power converter 100 according to a first embodiment will be described with reference to FIGS. 1-12.
(1) Overall Configuration for Power Converter The power converter 100 includes a first DC terminal 31 and a second DC terminal 32, and a plurality of (e.g., three) AC terminals 41 as shown in FIG. 1, for example. A DC power supply E1 is connected between the first DC terminal 31 and the second DC terminal 32. An AC load RA1 is connected to the plurality of AC terminals 41. The AC load RA1 may be, for example, a three-phase motor. The power converter 100 converts the DC output of the DC power supply E1 into AC power and outputs the AC power to the AC load RA1. The DC power supply E1 may include, for example, a solar cell or a fuel cell. The DC power supply E1 may include a DC-DC converter. In the power converter 100, if the DC power supply E1 connected between the first DC terminal 31 and the second DC terminal 32 is a storage battery, for example, the plurality of AC terminals 41 may be connected to a power grid, instead of the AC load RA1. This allows the power converter 100 to convert the DC power supplied from the DC power supply E1 into AC power and output the AC power to the power grid. This also allows the power converter 100 to convert the AC power supplied from the power grid into DC power and output the DC power to the DC power supply E1. As used herein, the "power grid" refers to the overall system to be used by an electricity provider such as an electric power utility company to supply electric power to a customer's power receiving equipment. In the power converter 100, if the plurality of AC terminals 41 are three AC terminals 41, then the AC power may be, for example, three-phase AC power having U-, V-, and W-phases.

The power converter 100 includes a power converter circuit 11, a plurality of (e.g., three) switches 8, a plurality of (e.g., three) resonant capacitors 9, a resonant inductor L1, a capacitor C1, and a controller 50. The power converter circuit 11 includes a plurality of (e.g., three) first switching elements 1 and a plurality of (e.g., three) second switching elements 2. In the power converter circuit 11, a plurality of (e.g., three) switching circuits 10, in each of which one of the plurality of first switching elements 1 and a corresponding one of the plurality of second switching elements 2 are connected one to one in series, are connected in parallel. In the power converter circuit 11, the plurality of first switching elements 1 are connected to the first DC terminal 31 and the plurality of second switching elements 2 are connected to the second DC terminal 32. Each of the plurality of switches 8 may be, for example, a bidirectional switch. The plurality of AC terminals 41 are provided one to one for the plurality of switching circuits 10, respectively. Each of the plurality of AC terminals 41 is connected to a connection node 3 between the first switching element 1 and the second switching element 2 of a corresponding one of the plurality of switching circuits 10. The plurality of switches 8 are provided one to one for the plurality of switching circuits 10, respectively. Each of the plurality of switches 8 has a first terminal thereof connected to the connection node 3 between the first switching element 1 and the second switching element 2 of a corresponding one of the plurality of switching circuits 10. The plurality of switches 8 have their respective second terminals connected in common to a common connection node 25. The plurality of resonant capacitors 9 are provided one to one for the plurality of switches 8, respectively. Each of the plurality of resonant capacitors 9 is connected between the first terminal of a corresponding one of the plurality of switches 8 and the second DC terminal 32. The resonant inductor L1 has a first terminal and a second terminal. The first terminal of the resonant inductor L1 is connected to the common connection node 25. The capacitor C1 is connected between the second terminal of the resonant inductor L1 and the second DC terminal 32. The controller 50 controls the plurality of first switching elements 1, the plurality of second switching elements 2, and the plurality of switches 8.

The controller 50 makes zero-voltage soft switching of each of the plurality of first switching elements 1 and the plurality of second switching elements 2.

(2) Details of Power Converter

As described above, the power converter 100 includes the first DC terminal 31 and the second DC terminal 32, the power converter circuit 11, the plurality of (e.g., three) AC terminals 41, the plurality of (e.g., three) switches 8, the plurality of (e.g., three) resonant capacitors 9, the resonant inductor L1, the capacitor C1, and the controller 50. In the power converter circuit 11, the plurality of (e.g., three) switching circuits 10, in each of which one of the plurality of first switching elements 1 and a corresponding one of the plurality of second switching elements 2 are connected one to one in series, are connected in parallel. The power converter 100 further includes a protection circuit 17. The power converter 100 further includes another capacitor C10. The capacitor C10 is connected between the first DC terminal 31 and the second DC terminal 32 and is connected to the power converter circuit 11 in parallel.

In the power converter 100, the DC power supply E1 may be connected, for example, between the first DC terminal 31 and the second DC terminal 32 and the AC load RA1 may be connected, for example, to the plurality of AC terminals 41.

In the following description, as for the plurality of switching circuits 10, the switching circuits 10 for the U-, V-, and W-phases will be hereinafter referred to as a "switching circuit 10U," a "switching circuit 10V," and a "switching circuit 10W," respectively, for the sake of convenience of description. Also, in the following description, the first switching element 1 and second switching element 2 of the switching circuit 10U will be hereinafter referred to as a "first switching element 1U" and a "second switching element 2U." Likewise, in the following description, the first switching element 1 and second switching element 2 of the switching circuit 10V will be hereinafter referred to as a "first switching element 1V" and a "second switching element 2V." Likewise, in the following description, the first switching element 1 and second switching element 2 of the switching circuit 10W will be hereinafter referred to as a "first switching element 1W" and a "second switching element 2W." Furthermore, in the following description, the connection node 3 between the first switching element 1U and the second switching element 2U will be hereinafter referred to as a "connection node 3U," the connection node 3 between the first switching element 1V and the second switching element 2V will be hereinafter referred to as a "connection node 3V," and the connection node 3 between the first switching element 1W and the second switching element 2W will be hereinafter referred to as a "connection node 3W." Furthermore, in the following description, the AC terminal 41 connected to the connection node 3U will be hereinafter referred to as an "AC terminal 41U," the AC terminal 41 connected to the connection node 3V will be hereinafter referred to as an "AC terminal 41V," and the AC terminal 41 connected to the connection node 3W will be hereinafter referred to as an "AC terminal 41W." Furthermore, in the following description, the resonant capacitor 9 connected to the second switching element 2U in parallel will be hereinafter referred to as a "resonant capacitor 9U," the resonant capacitor 9 connected to the second switching element 2V in parallel will be hereinafter referred to as a "resonant capacitor 9V," and the resonant capacitor 9 connected to the second switching element 2W in parallel will be hereinafter referred to as a "resonant capacitor 9W." Furthermore, in the following description, the switch 8 connected to the connection node 3U will be hereinafter referred to as a "switch 8U," the switch 8 connected to the connection node 3V will be hereinafter referred to as a "switch 8V," and the switch 8 connected to the connection node 3W will be hereinafter referred to as a "switch 8W."

In the power converter 100, the higher-potential output terminal (positive electrode) of the DC power supply E1 is connected to the first DC terminal 31, and the lower-potential output terminal (negative electrode) of the DC power supply E1 is connected to the second DC terminal 32. Also, in the power converter 100, the U-, V, and W-phases of the AC load RA1 are connected to the three AC terminals 41U, 41V, and 41W, respectively.

In the power converter circuit 11, each of the plurality of first switching elements 1 and the plurality of second switching elements 2 has a control terminal, a first main terminal, and a second main terminal. The respective control terminals of the plurality of first switching elements 1 and the plurality of second switching elements 2 are connected to the controller 50. In each of the plurality of switching circuits 10 of the power converter 100, the first main terminal of the first switching element 1 is connected to the first DC terminal 31, the second main terminal of the first switching element 1 is connected to the first main terminal of the second switching element 2, and the second main terminal of the second switching element 2 is connected to the second DC terminal 32. In each of the plurality of switching circuits 10, the first switching element 1 is a high-side switching element (P-side switching element) and the second switching element 2 is a low-side switching element (N-side switching element). Each of the plurality of first switching elements 1 and the plurality of second switching elements 2 may be, for example, an insulated gate bipolar transistor (IGBT). Thus, in each of the plurality of first switching elements 1 and the plurality of second switching elements 2, the control terminal, the first main terminal, and the second main terminal are a gate terminal, a collector terminal, and an emitter terminal, respectively. The power converter circuit 11 further includes a plurality of first diodes 4 which are connected one to one to the plurality of first switching elements 1 in antiparallel and a plurality of second diodes 5 which are connected one to one to the plurality of second switching elements 2 in antiparallel. In each of the plurality of first diodes 4, the anode of the first diode 4 is connected to the second main terminal (emitter terminal) of the first switching element 1 corresponding to the first diode 4, and the cathode of the first diode 4 is connected to the first main terminal (collector terminal) of the first switching element 1 corresponding to the first diode 4. In each of the plurality of second diodes 5, the anode of the second diode 5 is connected to the second main terminal (emitter terminal) of the second switching element 2 corresponding to the second diode 5, and the cathode of the second diode 5 is connected to the first main terminal (collector terminal) of the second switching element 2 corresponding to the second diode 5.

The U-phase of the AC load RA1 may be connected, for example, to the connection node 3U between the first switching element 1U and the second switching element 2U via the AC terminal 41U. The V-phase of the AC load RA1 may be connected, for example, to the connection node 3V between the first switching element 1V and the second switching element 2V via the AC terminal 41V. The W-phase of the AC load RA1 may be connected, for example, to the connection node 3W between the first switching element 1W and the second switching element 2W via the AC terminal 41W.

The plurality of first switching elements 1 and the plurality of second switching elements 2 are controlled by the controller 50.

The plurality of resonant capacitors 9 are provided one to one for the plurality of switches 8. Each of the plurality of resonant capacitors 9 is connected between the first terminal of its corresponding switch 8 and the second DC terminal 32. The power converter 100 includes a plurality of resonant circuits. The plurality of resonant circuits includes a resonant circuit having the resonant capacitor 9U and the resonant inductor L1, a resonant circuit having the resonant capacitor 9V and the resonant inductor L1, and a resonant circuit having the resonant capacitor 9W and the resonant inductor L1. The plurality of resonant circuits shares the resonant inductor L1 in common.

Each of the plurality of switches 8 may include, for example, a first IGBT 6 and a second IGBT 7 which are connected together in antiparallel. In each of the plurality of switches 8, the collector terminal of the first IGBT 6 and the emitter terminal of the second IGBT 7 are connected to each other and the emitter terminal of the first IGBT 6 and the collector terminal of the second IGBT 7 are connected to each other. In each of the plurality of switches 8, the first IGBT 6 is connected to the connection node 3 of the switching circuit 10 corresponding to the switch 8 including the first IGBT 6. In each of the plurality of switches 8, the second IGBT 7 is connected to the connection node 3 of the switching circuit 10 corresponding to the switch 8 including the second IGBT 7. The switch 8U is connected to the connection node 3U between the first switching element 1U and the second switching element 2U. The switch 8V is connected to the connection node 3V between the first switching element 1V and the second switching element 2V. The switch 8W is connected to the connection node 3W between the first switching element 1W and the second switching element 2W. In the following description, the first IGBT 6 and second IGBT 7 of the switch 8U will be hereinafter referred to as a "first IGBT 6U" and a "second IGBT 7U," respectively, the first IGBT 6 and second IGBT 7 of the switch 8V will be hereinafter referred to as a "first IGBT 6V" and a "second IGBT 7V," respectively, and the first IGBT 6 and second IGBT 7 of the switch 8W will be hereinafter referred to as a "first IGBT 6W" and a "second IGBT 7W," respectively, for the sake of convenience of description.

The plurality of switches 8 are controlled by the controller 50. In other words, the first IGBT 6U, the second IGBT 7U, the first IGBT 6V, the second IGBT 7V, the first IGBT 6W, and the second IGBT 7W are controlled by the controller 50.

The resonant inductor L1 has a first terminal and a second terminal. In the resonant inductor L1, the first terminal of the resonant inductor L1 is connected to the common connection node 25 and the second terminal of the resonant inductor L1 is connected to the capacitor C1.

The capacitor C1 is connected between the second terminal of the resonant inductor L1 and the second DC terminal 32. The capacitor C1 may be, for example, a film capacitor.

The protection circuit 17 includes a third diode 13 and a fourth diode 14. The third diode 13 is connected between the common connection node 25 and the first DC terminal 31. In the third diode 13, the anode of the third diode 13 is connected to the common connection node 25 and the cathode of the third diode 13 is connected to the first DC terminal 31. The fourth diode 14 is connected between the common connection node 25 and the second DC terminal 32. In the fourth diode 14, the anode of the fourth diode 14 is connected to the second DC terminal 32 and the cathode of the fourth diode 14 is connected to the common connection node 25. Thus, the fourth diode 14 is connected to the third diode 13 in series.

The capacitor C10 is connected between the first DC terminal 31 and the second DC terminal 32 and is connected to the power converter circuit 11 in parallel. The capacitor C10 may be, for example, an electrolytic capacitor.

The controller 50 controls the plurality of first switching elements 1, the plurality of second switching elements 2, and the plurality of switches 8. The agent that performs the functions of the controller 50 includes a computer system. The computer system includes a single or a plurality of computers. The computer system may include a processor and a memory as principal hardware components thereof. The computer system serves as the agent that performs the functions of the controller 50 according to the present disclosure by making the processor execute a program stored in the memory of the computer system. The program may be stored in advance in the memory of the computer system. Alternatively, the program may also be downloaded through a telecommunications line or be distributed after having been recorded in a non-transitory storage medium such as a memory card, an optical disc, or a hard disk drive (magnetic disk), any of which is readable for the computer system. The processor of the computer system may be made up of a single or a plurality of electronic circuits including a semiconductor integrated circuit (IC) or a large-scale integrated circuit (LSI). Those electronic circuits may be either integrated together on a single chip or distributed on multiple chips, whichever is appropriate. Those multiple chips may be aggregated together in a single device or distributed in multiple devices without limitation.

The controller 50 outputs pulse width modulation (PWM) signals SU1, SV1, SW1 to control the ON/OFF states of the plurality of first switching elements 1U, 1V, 1W, respectively. Each of the PWM signals SU1, SV1, SW1 is a signal having, for example, a potential level that alternates between a first potential level (hereinafter referred to as a "low level") and a second potential level (hereinafter referred to as a "high level") higher than the first potential level. The first switching elements 1U, 1V, 1W respectively turn ON when the PWM signals SU1, SV1, SW1 are high level and respectively turn OFF when the PWM signals SU1, SV1, SW1 are low level. In addition, the controller 50 also outputs PWM signals SU2, SV2, SW2 to control the ON/OFF states of the plurality of second switching elements 2U, 2V, 2W, respectively. Each of the PWM signals SU2, SV2, SW2 is a signal having for example, a potential level that alternates between the first potential level and the second potential level higher than the first potential level. The second switching elements 2U, 2V, 2W respectively turn ON when the PWM signals SU2, SV2, SW2 are high level and respectively turn OFF when the PWM signals SU2, SV2, SW2 are low level. The controller 50 generates, using a carrier signal (refer to FIG. 2) having a saw-tooth waveform, the PWM signals SU1, SV1, SW1 for the plurality of first switching elements 1U, 1V, 1W, respectively, and the PWM signals SU2, SV2, SW2 for the plurality of second switching elements 2U, 2V, 2W, respectively. More specifically, the controller 50 generates, based on at least the carrier signal and a U-phase voltage instruction, the PWM signals SU1, SU2 to be supplied to the first switching element 1U and the second switching element 2U, respectively. Also, the controller 50 generates, based on at least the carrier signal and a V-phase voltage instruction, the PWM signals SV1, SV2 to be supplied to the first switching element 1V and the second switching element 2V, respectively. Furthermore, the controller 50 further generates, based on at least the carrier signal and a W-phase voltage instruction, the PWM signals SW1, SW2 to be supplied to the first switching element 1W and the second switching element 2W, respectively. The U-phase voltage instruction, the V-phase voltage instruction, and the W-phase voltage instruction are sinusoidal wave signals, of which the phases are different from each other by 120 degrees and of which the amplitude (voltage instruction value) changes with time. Also, the U-phase voltage instruction, the V-phase voltage instruction, and the W-phase voltage instruction each have one cycle of the same length. In addition, one cycle of the U-phase voltage instruction, the V-phase voltage instruction, and the W-phase voltage instruction is longer than one cycle of the carrier signal.

The duty of the PWM signals SU1, SU2 to be supplied from the controller 50 to the first switching element 1U and the second switching element 2U, respectively, varies in accordance with the U-phase voltage instruction. The controller 50 generates the PWM signal SU1 to be supplied to the first switching element 1U by comparing the U-phase voltage instruction with the carrier signal. The controller 50 generates the PWM signal SU2 to be supplied to the second switching element 2U by inverting the PWM signal SU1 to be supplied to the first switching element 1U. In addition, to prevent the respective ON periods of the first switching element 1U and the second switching element 2U from overlapping with each other, the controller 50 sets a dead time Td (refer to FIG. 2) between a period in which the PWM signal SU1 has high level and a period in which the PWM signal SU2 has high level.

The duty of the PWM signals SV1, SV2 to be supplied from the controller 50 to the first switching element 1V and the second switching element 2V, respectively, varies in accordance with the V-phase voltage instruction. The controller 50 generates the PWM signal SV1 to be supplied to the first switching element 1V by comparing the V-phase voltage instruction with the carrier signal. The controller 50 generates the PWM signal SV2 to be supplied to the second switching element 2V by inverting the PWM signal SV1 to be supplied to the first switching element 1V. In addition, to prevent the respective ON periods of the first switching element 1V and the second switching element 2V from overlapping with each other, the controller 50 sets the dead time Td (refer to FIG. 2) between a period in which the PWM signal SV1 has high level and a period in which the PWM signal SV2 has high level.

The duty of the PWM signals SW1, SW2 to be supplied from the controller 50 to the first switching element 1W and the second switching element 2W, respectively, varies in accordance with the W-phase voltage instruction. The controller 50 generates the PWM signal SW1 to be supplied to the first switching element 1W by comparing the W-phase voltage instruction with the carrier signal. The controller 50 generates the PWM signal SW2 to be supplied to the second switching element 2W by inverting the PWM signal SW1 to be supplied to the first switching element 1W. In addition, to prevent the respective ON periods of the first switching element 1W and the second switching element 2W from overlapping with each other, the controller 50 sets a dead time Td (refer to FIG. 3) between a period in which the PWM signal SW1 has high level and a period in which the PWM signal SW2 has high level.

Figure 4:
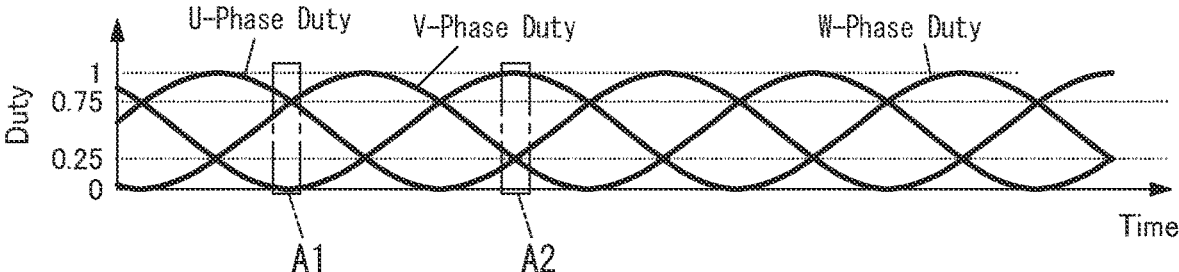
FIG. 4 shows how duties, respectively corresponding to three-phase voltage instructions in an AC load connected to a plurality of AC terminals of the power converter, change with time.

The U-phase voltage instruction, the V-phase voltage instruction, and the W-phase voltage instruction may be, for example, sinusoidal wave signals, of which the phases are different from each other by 120 degrees and of which the amplitude changes with time. Thus, the respective duties of the PWM signals SU1, SV1, SW1 change in the form of sinusoidal waves, of which the phases are different from each other by 120 degrees, as shown in FIG. 4, for example. In the same way, the respective duties of the PWM signals SU2, SV2, SW2 also change in the form of sinusoidal waves, of which the phases are different from each other by 120 degrees.

The controller 50 generates the respective PWM signals SU1, SU2, SV1, SV2, SW1, SW2 based on the carrier signal, the respective voltage instructions, and information about the state of the AC load RA1. For example, if the AC load RA1 is a three-phase motor, the information about the state of the AC load RA1 may include, for example, detection values supplied from a plurality of current sensors for respectively detecting currents flowing through the U-, V-, and W-phases of the AC load RA1.

The plurality of switches 8, the resonant inductor L1, the plurality of resonant capacitors 9, the capacitor C1, and the protection circuit 17 are provided to make zero-voltage soft switching of the plurality of first switching elements 1 and the plurality of second switching elements 2.

In this power converter 100, the controller 50 controls not only the plurality of first switching elements 1 and the plurality of second switching elements 2 of the power converter circuit 11 but also the plurality of switches 8 as well.

The controller 50 generates control signals SU6, SU7, SV6, SV7, SW6, SW7 for controlling the respective ON/OFF states of the first IGBT 6U, the second IGBT 7U, the first IGBT 6V, the second IGBT 7V, the first IGBT 6W, and the second IGBT 7W, respectively, and outputs the control signals SU6, SU7, SV6, SV7, SW6, SW7 to the respective gate terminals of the first IGBT 6U, the second IGBT 7U, the first IGBT 6V, the second IGBT 7V, the first IGBT 6W, and the second IGBT 7W.

If the first IGBT 6U is ON and the second IGBT 7U is OFF, the switch 8U allows a charging current that flows through the capacitor C1, the resonant inductor L1, the switch 8U, and the resonant capacitor 9U in this order to charge the resonant capacitor 9U to pass therethrough. On the other hand, if the first IGBT 6U is OFF and the second IGBT 7U is ON, the switch 8U allows a discharging current that flows through the resonant capacitor 9U, the switch 8U, the resonant inductor L1, and the capacitor C1 in this order to remove electric charges from the resonant capacitor 9U to pass therethrough.

If the first IGBT 6V is ON and the second IGBT 7V is OFF, the switch 8V allows a charging current that flows through the capacitor C1, the resonant inductor L1, the switch 8V, and the resonant capacitor 9V in this order to charge the resonant capacitor 9V to pass therethrough. On the other hand, if the first IGBT 6V is OFF and the second IGBT 7V is ON, the switch 8V allows a discharging current that flows through the resonant capacitor 9V, the switch 8V, the resonant inductor L1, and the capacitor C1 in this order to remove electric charges from the resonant capacitor 9V to pass therethrough.

If the first IGBT 6W is ON and the second IGBT 7W is OFF, the switch 8W allows a charging current that flows through the capacitor C1, the resonant inductor L1, the switch 8W, and the resonant capacitor 9W in this order to charge the resonant capacitor 9W to pass therethrough. On the other hand, if the first IGBT 6W is OFF and the second IGBT 7W is ON, the switch 8W allows a discharging current that flows through the resonant capacitor 9W, the switch 8W, the resonant inductor L1, and the capacitor C1 in this order to remove electric charges from the resonant capacitor 9W to pass therethrough.

(3) Operation of Power Converter

In the following description, a current flowing through the resonant inductor L1 will be hereinafter designated by iL1, a current flowing through the U-phase of the AC load RA1 will be hereinafter designated by iU, a current flowing through the V-phase of the AC load RA1 will be hereinafter designated by iV, and a current flowing through the W-phase of the AC load RA1 will be hereinafter designated by iW. Also, in the following description, as for each of these currents iL1, iU, iV, and iW, if the current flows in the direction indicated by a corresponding to one of the arrows shown in FIG. 1, then the polarity of the current is supposed to be positive. On the other hand, if the current flows in the direction opposite from the one indicated by the arrow shown in FIG. 1, then the polarity of the current is supposed to be negative.

The power converter 100 includes the protection circuit 17 including the third diode 13 and the fourth diode 14 as described above. Thus, in this power converter 100, when the first IGBT 6U of the switch 8U turns OFF in a state where the first IGBT 6U of the switch 8U is ON and the positive current iL1 is flowing through the resonant inductor L1, for example, the current iL1 flowing through the resonant inductor L1 is regenerated to the power converter circuit 11 via the third diode 13 until the current iL1 flowing through the resonant inductor L1 goes zero due to the consumption of energy of the resonant inductor L1. Also, in this power converter 100, when the second IGBT 7U of the switch 8U turns OFF in a state where the second IGBT 7U of the switch 8U is ON and the negative current iL1 is flowing through the resonant inductor L1, for example, a current flows along the path passing through the fourth diode 14, the resonant inductor L1, and the capacitor C1 in this order until the current iL1 flowing through the resonant inductor L1 goes zero due to the consumption of energy of the resonant inductor L1. Furthermore, in this power converter 100, when the first IGBT 6V of the switch 8V turns OFF in a state where the first IGBT 6V of the switch 8V is ON and the positive current iL1 is flowing through the resonant inductor L1, for example, the current iL1 flowing through the resonant inductor L1 is regenerated to the power converter circuit 11 via the third diode 13 until the current iL1 flowing through the resonant inductor L1 goes zero due to the consumption of energy of the resonant inductor L1. Furthermore, in this power converter 100, when the second IGBT 7V of the switch 8V turns OFF in a state where the second IGBT 7V of the switch 8V is ON and the negative current iL1 is flowing through the resonant inductor L1, for example, a current flows along the path passing through the fourth diode 14, the resonant inductor L1, and the capacitor C1 in this order until the current iL1 flowing through the resonant inductor L1 goes zero due to the consumption of energy of the resonant inductor L1. Furthermore, in this power converter 100, when the first IGBT 6W of the switch 8W turns OFF in a state where the first IGBT 6W of the switch 8W is ON and the positive current iL1 is flowing through the resonant inductor L1, for example, the current iL1 flowing through the resonant inductor L1 is regenerated to the power converter circuit 11 via the third diode 13 until the current iL1 flowing through the resonant inductor L1 goes zero due to the consumption of energy of the resonant inductor L1. Furthermore, in this power converter 100, when the second IGBT 7W of the switch 8W turns OFF in a state where the second IGBT 7W of the switch 8W is ON and the negative current iL1 is flowing through the resonant inductor L1, for example, a current flows along the path passing through the fourth diode 14, the resonant inductor L1, and the capacitor C1 in this order until the current iL1 flowing through the resonant inductor L1 goes zero due to the consumption of energy of the resonant inductor L1.

Next, it will be described with reference to FIGS. 1 and 2 how the controller 50 performs zero-voltage soft switching control on each of the plurality of first switching elements 1 and the plurality of second switching elements 2.

When the zero-voltage soft switching control is performed on the first switching element 1, the voltage across the first switching element 1 needs to be reduced to zero just before the first switching element 1 turns ON. Thus, the controller 50 reduces the voltage across the first switching element 1 as the target of the zero-voltage soft switching control to zero by turning the first IGBT 6 corresponding to the first switching element 1 ON to cause the resonant capacitor 9, which is connected to the resonant inductor L1 and the first switching element 1 in series, to produce resonance and thereby charge the resonant capacitor 9 with the electric charges stored in the capacitor C1.

On the other hand, when the zero-voltage soft switching control is performed on the second switching element 2, the voltage across the second switching element 2 needs to be reduced to zero just before the second switching element 2 turns ON. Thus, the controller 50 reduces the voltage across the second switching element 2 as the target of the zero-voltage soft switching control to zero by turning the second IGBT 7 corresponding to the second switching element 2 ON to cause the resonant capacitor 9, which is connected to the resonant inductor L1 and the second switching element 2 in parallel, to produce resonance and thereby remove the electric charges from the resonant capacitor 9 to the capacitor C1. The controller 50 charges and discharges the resonant capacitor 9 via the switch 8 such that the dead time Td agrees with a half cycle ($\pi \times \sqrt{LC}$) of LC resonance. This allows the power converter 100 to make zero-voltage soft switching.

Figure 2:
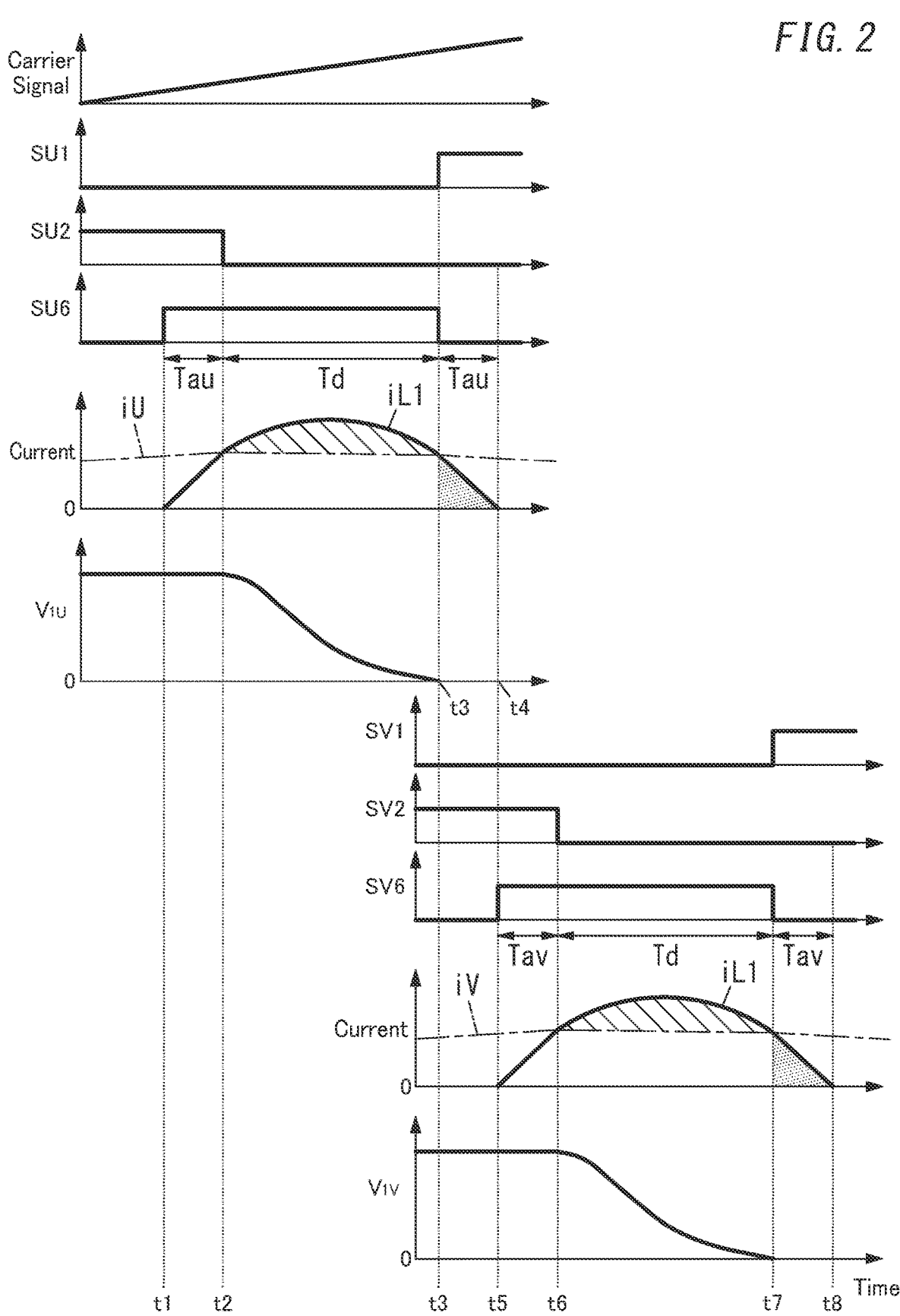
FIG. 2 illustrates how the power converter operates.

The PWM signals SU1, SU2 to be respectively supplied from the controller 50 to the first switching element 1U and the second switching element 2U of the switching circuit 10U are shown in FIG. 2. In addition, the control signal SU6 to be supplied from the controller 50 to the first IGBT 6U of the switch 8U, the current iU flowing through the U-phase of the AC load RA1, the current iL1 flowing through the resonant inductor L1, and the voltage V$_{1U}$ across the first switching element 1U are also shown in FIG. 2. Furthermore, the PWM signals SV1, SV2 to be respectively supplied from the controller 50 to the first switching element 1V and the second switching element 2V of the switching circuit 10V are shown in FIG. 2. In addition, the control signal SV6 to be supplied from the controller 50 to the first IGBT 6V of the switch 8V, the current iV flowing through the V-phase of the AC load RA1, the current iL1 flowing through the resonant inductor L1, and the voltage V$_{1V}$ across the first switching element 1V are also shown in FIG. 2.

Furthermore, the dead time Td that the controller 50 sets to prevent the first switching element 1 and the second switching element 2 of the same phase from turning ON simultaneously is also shown in FIG. 2. Besides, an additional time Tau set by the controller 50 with respect to the control signal SU6 for the first IGBT 6U of the switch 8U and an additional time Tav set by the controller 50 with respect to the control signal SV6 for the first IGBT 6V of the switch 8V are also shown in FIG. 2.

Figure 3:
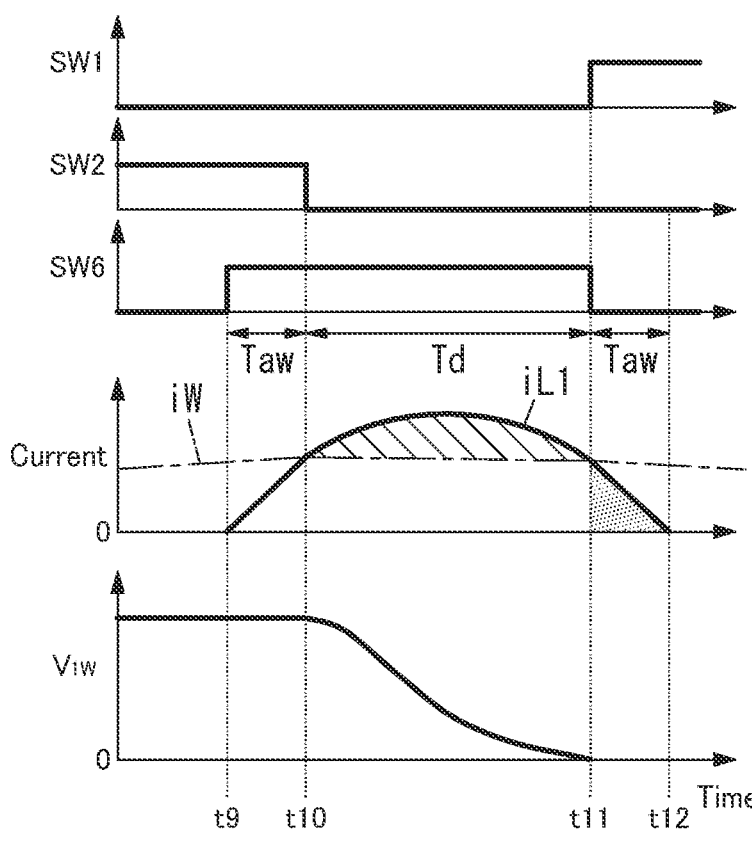
FIG. 3 illustrates how the power converter operates.

The PWM signals SW1, SW2 to be respectively supplied from the controller 50 to the first switching element 1W and the second switching element 2W of the switching circuit 10W are shown in FIG. 3. In addition, the control signal SW6 to be supplied from the controller 50 to the first IGBT 6W of the switch 8W and the current iW flowing through the W-phase of the AC load RA1 are also shown in FIG. 3. The current iL1 flowing through the resonant inductor L1 is also shown in FIG. 3. The voltage V$_{1W}$ across the first switching element 1W is also shown in FIG. 3.

Furthermore, the dead time Td that the controller 50 sets to prevent the first switching element 1W and the second switching element 2W from turning ON simultaneously is also shown in FIG. 3. Besides, an additional time Taw set by the controller 50 with respect to the control signal SW6 for the first IGBT 6W of the switch 8W is also shown in FIG. 3.

The additional time Tau is an amount of time that the controller 50 provides to make the high-level period of the control signal SU6 longer than the dead time Td by setting the beginning t1 of the high-level period of the control signal SU6 to be supplied to the first IGBT 6U of the switch 8U at a point in time earlier than the beginning t2 of the dead time Td provided to prevent the first switching element 1U and the second switching element 2U from turning ON simultaneously. The length of the additional time Tau is determined by the value of the current iU. To start producing the LC resonance from the beginning t2 of the dead time Td, it is preferable that the value of the current iL1 agree with the value of the current iU at the beginning t2 of the dead time. This is because as long as iL1<iU is satisfied, all current flows through the AC load RA1, and therefore, the resonant capacitor 9U cannot be charged. The end of the high-level period of the control signal SU6 may be simultaneous with, or later than, the end t3 of the dead time Td. In the example shown in FIG. 2, the end of the high-level period of the control signal SU6 is set to be simultaneous with the end of the dead time Td. The controller 50 sets the high-level period of the control signal SU6 at Tau+Td. The voltage V$_{1U}$ across the first switching element 1U goes zero at the end t3 of the dead time Td. In the example shown in FIG. 2, the current iL1 starts flowing through the resonant inductor L1 at the beginning t1 of the high-level period of the control signal SU6 and goes zero at a time t4 when the additional time Tau has passed since the end t3 of the dead time Td. At this time, the current iL1 satisfies iL1≥iU from the beginning t2 of the dead time Td, and therefore, the current iL1 in the shaded part of the current waveform shown as the fifth waveform from the top of FIG. 2 flows into the resonant capacitor 9U to produce the LC resonance. From the end t3 of the dead time Td and on, the current iL1 is regenerated to the power converter circuit 11 via the third diode 13.

The additional time Tav is an amount of time that the controller 50 provides to make the high-level period of the control signal SV6 longer than the dead time Td by setting the beginning t5 of the high-level period of the control signal SV6 to be supplied to the first IGBT 6V of the switch 8V at a point in time earlier than the beginning t6 of the dead time Td provided to prevent the first switching element 1V and the second switching element 2V from turning ON simultaneously. The length of the additional time Tav is determined by the value of the current 1V. To start producing the LC resonance from the beginning t6 of the dead time Td, it is preferable that the value of the current iL1 agree with the value of the current iV at the beginning t6 of the dead time Td. This is because as long as iL1<iV is satisfied, all current flows through the AC load RA1, and therefore, the resonant capacitor 9V cannot be charged. The end of the high-level period of the control signal SV6 may be simultaneous with, or later than, the end t7 of the dead time Td. In the example shown in FIG. 2, the end of the high-level period of the control signal SV6 is set to be simultaneous with the end t7 of the dead time Td. The controller 50 sets the high-level period of the control signal SV6 at Tav+Td. The voltage Viv across the first switching element 1V goes zero at the end t7 of the dead time Td. In the example shown in FIG. 2, the current iL1 starts flowing through the resonant inductor L1 at the beginning t5 of the high-level period of the control signal SV6 and goes zero at a time t8 when the additional time Tav has passed since the end t7 of the dead time Td. At this time, the current iL1 satisfies iL1≥iV from the beginning t6 of the dead time Td and on, and therefore, the current iL1 in the shaded part of the current waveform shown as the tenth waveform from the top of FIG. 2 flows into the resonant capacitor 9V to produce the LC resonance. From the end t7 of the dead time Td and on, the current iL1 is regenerated to the power converter circuit 11 via the third diode 13.

The additional time Taw is an amount of time that the controller 50 provides to make the high-level period of the control signal SW6 longer than the dead time Td by setting the beginning t9 of the high-level period of the control signal SW6 to be supplied to the first IGBT 6W of the switch 8W at a point in time earlier than the beginning t10 of the dead time Td provided to prevent the first switching element 1W and the second switching element 2W from turning ON simultaneously. The length of the additional time Taw is determined by the value of the current iW. To start producing the LC resonance from the beginning t10 of the dead time Td, it is preferable that the value of the current iL1 agree with the value of the current iW at the beginning t10 of the dead time. This is because as long as iL1<iW is satisfied, all current flows through the AC load RA1, and therefore, the resonant capacitor 9W cannot be charged. The end of the high-level period of the control signal SW6 may be simultaneous with, or later than, the end t11 of the dead time Td. In the example shown in FIG. 3, the end of the high-level period of the control signal SW6 is set to be simultaneous with the end t11 of the dead time Td. The controller 50 sets the high-level period of the control signal SW6 at Taw+Td. The voltage V$_{1W}$ across the first switching element 1W goes zero at the end t11 of the dead time Td. In the example shown in FIG. 3, the current iL1 starts flowing through the resonant inductor L1 at the beginning t9 of the high-level period of the control signal SW6 and goes zero at a time t12 when the additional time Taw has passed since the end t11 of the dead time Td. At this time, the current iL1 satisfies iL1≥iW from the beginning t10 of the dead time Td and on, and therefore, the current iL1 in the shaded part of the current waveform shown as the fourth waveform from the top of FIG. 3 flows into the resonant capacitor 9W to produce the LC resonance. From the end t11 of the dead time Td and on, the current iL1 is regenerated to the power converter circuit 11 via the third diode 13.

To start producing the LC resonance at the beginning t2 of the dead time Td between the high-level period of the PWM signal SU1 and the high-level period of the PWM signal SU2 as described above, the controller 50 determines the additional time Tau based on the current iU such that iL1=iU is satisfied at the beginning t2 of the dead time Td. More specifically, using either the detection result of the current iU by a current sensor or a signal processing value thereof, or an estimated value of the current iU, the inductance L of the resonant inductor L1 that has been stored in advance, and the detection result of the voltage V1 across the capacitor C1, for example, the controller 50 determines the additional time Tau by the equation: $Tau=iU\times(L/V1)$. In this case, as the detection result of the current iU or the signal processing value thereof, either a detection value at a carrier cycle at which the additional time Tau is added or a detection value at a timing closest to the carrier cycle may be used. Also, in this case, as the estimated value of the current iU, a value of the current iU estimated at the carrier cycle at which the additional time Tau is added may be used, for example.

To start producing the LC resonance at the beginning t6 of the dead time Td between the high-level period of the PWM signal SV1 and the high-level period of the PWM signal SV2 as described above, the controller 50 determines the additional time Tav based on the current iV such that iL1=iV is satisfied at the beginning t6 of the dead time Td. More specifically, using either the detection result of the current iV by a current sensor or a signal processing value thereof, or an estimated value of the current iV, the inductance L of the resonant inductor L1 that has been stored in advance, and the detection result of the voltage V1 across the capacitor C1, for example, the controller 50 determines the additional time Tav by the equation: $Tav=iV\times(L/V1)$. In this case, as the detection result of the current iV or the signal processing value thereof, either a detection value at a carrier cycle at which the additional time Tav is added or a detection value at a timing closest to the carrier cycle may be used. Also, in this case, as the estimated value of the current 1V, a value of the current iV estimated at the carrier cycle at which the additional time Tav is added may be used, for example.

To start producing the LC resonance at the beginning t10 of the dead time Td between the high-level period of the PWM signal SW1 and the high-level period of the PWM signal SW2 as described above, the controller 50 determines the additional time Taw based on the current iW such that iL1=iW is satisfied at the beginning t10 of the dead time Td. More specifically, using either the detection result of the current iW by a current sensor, the inductance L of the resonant inductor L1 that has been stored in advance, and the detection result of the voltage W1 across the capacitor C1, for example, the controller 50 determines the additional time Taw by the equation: $Taw=iW\times(L/W1)$. In this case, as the detection result of the current iW or the signal processing value thereof, either a detection value at a carrier cycle at which the additional time Taw is added or a detection value at a timing closest to the carrier cycle may be used. Also, in this case, as the estimated value of the current iW, a value of the current iW estimated at the carrier cycle at which the additional time Taw is added may be used, for example.

In the power converter 100, the respective phases of the three-phase (namely, U-, V-, and W-phase) voltage instructions are different from each other by 120 degrees, but the instruction values of two-phase voltage instructions come close to each other every electrical angle of 60 degrees and the respective duties of the two-phase PWM signals also come close to each other (refer to the ranges A1 and A2 shown in FIG. 4). In the range A1 shown in FIG. 4, the duties of the U-phase PWM signal and the V-phase PWM signal are in the vicinity of 0.75. In the range A2 shown in FIG. 4, the duties of the U-phase PWM signal and the V-phase PWM signal are in the vicinity of 0.25. In the range A1, the resonant current is a positive current iL1. In the range A2 on the other hand, the resonant current is a negative current iL1. In the range A1, in one cycle period of the carrier signal, for example, the time lag between the beginning t1 of the high-level period of the control signal SU6 to be supplied to the first IGBT 6U and the beginning t5 of the high-level period of the control signal SV6 to be supplied to the first IGBT 6V may be so short that the U-phase resonant current and the V-phase resonant current may flow through the resonant inductor L1 simultaneously. In the power converter 100, the resonant current has the opposite direction in the range A2 from in the range A1 but the U-phase resonant current and the V-phase resonant current may flow simultaneously through the resonant inductor L1 in the range A2.

Suppose the respective capacitances of the plurality of resonant capacitors 9U, 9V, and 9W are designated by Cru, Cry, and Crw, respectively. In that case, if a U-phase current and a V-phase current flow simultaneously through the resonant inductor L1, a capacitor having a combined capacitance (=Cru+Crv) of the resonant capacitor 9U and the resonant capacitor 9V is connected to the resonant inductor L1 in series in an equivalent circuit. Thus, in the power converter 100, if two-phase currents flow simultaneously through the resonant inductor L1, then the resonant frequency of a resonant circuit including the resonant inductor L1 changes compared to a situation where a single-phase current flows through the resonant inductor L1. Consequently, the power converter 100 cannot make zero-voltage soft switching.

In contrast, in the power converter 100, when determining that two-phase resonant currents corresponding to two switching circuits 10 belonging to the plurality of switching circuits 10 flow simultaneously through the resonant inductor L1, the controller 50 performs the control of shifting the respective ON periods of the first switching element 1 and the second switching element 2 in one of the two switching circuits 10. As used herein, the expression "when determining that two-phase resonant currents flow simultaneously" may also refer to a situation where presumption has been made in advance that the two-phase currents would flow simultaneously through the resonant inductor L1.

FIG. 2 shows an exemplary boundary condition between a situation where the U-phase resonant current and the V-phase resonant current do not overlap with each other (i.e., do not flow simultaneously) and a situation where the U-phase current and the V-phase current overlap with each other (i.e., flow simultaneously). The boundary condition will be described with reference to FIG. 2. In the power converter 100, if the time lag between the beginning t3 of the high-level period of the PWM signal SU1 to be supplied to the first switching element 1U of the switching circuit 10U and the beginning t7 of the high-level period of the PWM signal SV1 to be supplied to the first switching element 1V of the switching circuit 10V is equal to or greater than (Tau+Tav+Td), then the U-phase resonant current and the V-phase resonant current do not overlap with each other. On the other hand, if the time lag is less than (Tau+Tav+Td), then the U-phase resonant current and the V-phase resonant current overlap with each other. That is to say, with a threshold value for the time lag set at (Tau+Tav+Td) in accordance with the boundary condition, if the time lag is less than the threshold value, presumption may be made that resonant currents corresponding to the two phases of the switching circuit 10U and the switching circuit 10V belonging to the plurality of switching circuits 10 would flow simultaneously through the resonant inductor L1. Note that this threshold value is only an example, and the threshold value may also be set at any other value. For example, with the error of the additional time Tau and the error of the additional time Tav taken into account, the threshold value may also be set at a value even larger than (Tau+Tav+Td). In addition, the above-described method for calculating the time lag to determine whether the two-phase resonant currents flow simultaneously is only an example. Rather, any other calculating method may also be adopted as long as a time lag corresponding to the time lag described above may be calculated. For example, as the time lag for use to determine whether the two-phase resonant currents flow simultaneously, a time lag between the end t2 of the high-level period of the PWM signal SU2 to be supplied to the second switching element 2U of the switching circuit 10U and the end t6 of the high-level period of the PWM signal SV2 to be supplied to the second switching element 2V of the switching circuit 10V may also be used. In this case, if the time lag is less than (Tau+Tav+Td) to cause the resonant currents to overlap with each other, a period of time for which the two-phase resonant currents actually overlap with each other will be designated by Tov_uv. In the power converter 100, if the above-described boundary condition is adopted, a V-phase (or U-phase) resonant current starts to flow as soon as a U-phase (or V-phase) resonant current has finished flowing.

In the power converter 100, if the time lag between the beginning t3 of the high-level period of the PWM signal SU1 to be supplied to the first switching element 1U of the switching circuit 10U and the beginning t11 of the high-level period of the PWM signal SW1 to be supplied to the first switching element 1W of the switching circuit 10W is equal to or greater than (Tau+Taw+Td), then the U-phase resonant current and the W-phase resonant current do not overlap with each other. On the other hand, if the time lag is less than (Tau+Taw+Td), then the U-phase resonant current and the W-phase resonant current overlap with each other. That is to say, with a threshold value for the time lag set at (Tau+Taw+Td) in accordance with the boundary condition, if the time lag is less than the threshold value, presumption may be made that resonant currents corresponding to the two phases of the switching circuit 10U and the switching circuit 10W belonging to the plurality of switching circuits 10 would flow simultaneously through the resonant inductor L1. Note that this threshold value is only an example, and the threshold value may also be set at any other value. For example, with the error of the additional time Tau and the error of the additional time Taw taken into account, the threshold value may also be set at a value even larger than (Tau+Taw+Td).

In addition, the above-described method for calculating the time lag to determine whether the two-phase resonant currents flow simultaneously is only an example. Rather, any other calculating method may also be adopted as long as a time lag corresponding to the time lag described above may be calculated. For example, as the time lag for use to determine whether the two-phase resonant currents flow simultaneously, a time lag between the end t2 of the high-level period of the PWM signal SU2 to be supplied to the second switching element 2U of the switching circuit 10U and the end t10 of the high-level period of the PWM signal SW2 to be supplied to the second switching element 2W of the switching circuit 10W may also be used. In this case, if the time lag is less than (Tau+Taw+Td) to cause the resonant currents to overlap with each other, a period of time for which the two-phase resonant currents actually overlap with each other will be designated by Tov_uw.

In the power converter 100, if the time lag between the beginning t7 of the high-level period of the PWM signal SV1 to be supplied to the first switching element 1V of the switching circuit 10V and the beginning t11 of the high-level period of the PWM signal SW1 to be supplied to the first switching element 1W of the switching circuit 10W is equal to or greater than (Tav+Taw+Td), then the V-phase resonant current and the W-phase resonant current do not overlap with each other. On the other hand, if the time lag is less than (Tav+Taw+Td), then the V-phase resonant current and the W-phase resonant current overlap with each other. That is to say, with a threshold value for the time lag set at (Tav+Taw+Td) in accordance with the boundary condition, if the time lag is less than the threshold value, presumption may be made that resonant currents corresponding to the two phases of the switching circuit 10V and the switching circuit 10W belonging to the plurality of switching circuits 10 would flow simultaneously through the resonant inductor L1. Note that this threshold value is only an example, and the threshold value may also be set at any other value. For example, with the error of the additional time Tav and the error of the additional time Taw taken into account, the threshold value may also be set at a value even larger than (Tav+Taw+Td).

In addition, the above-described method for calculating the time lag to determine whether the two-phase resonant currents flow simultaneously is only an example. Rather, any other calculating method may also be adopted as long as a time lag corresponding to the time lag described above may be calculated. For example, as the time lag for use to determine whether the two-phase resonant currents flow simultaneously, a time lag between the end t6 of the high-level period of the PWM signal SV2 to be supplied to the second switching element 2V of the switching circuit 10V and the end t10 of the high-level period of the PWM signal SW2 to be supplied to the second switching element 2W of the switching circuit 10W may also be used. In this case, if the time lag is less than (Tav+Taw+Td) to cause the resonant currents to overlap with each other, a period of time for which the two-phase resonant currents actually overlap with each other will be designated by Tov_vw.

(3-1) Operation of Controller in Period Corresponding to Range A1 Shown in FIG. 4

Figure 5:
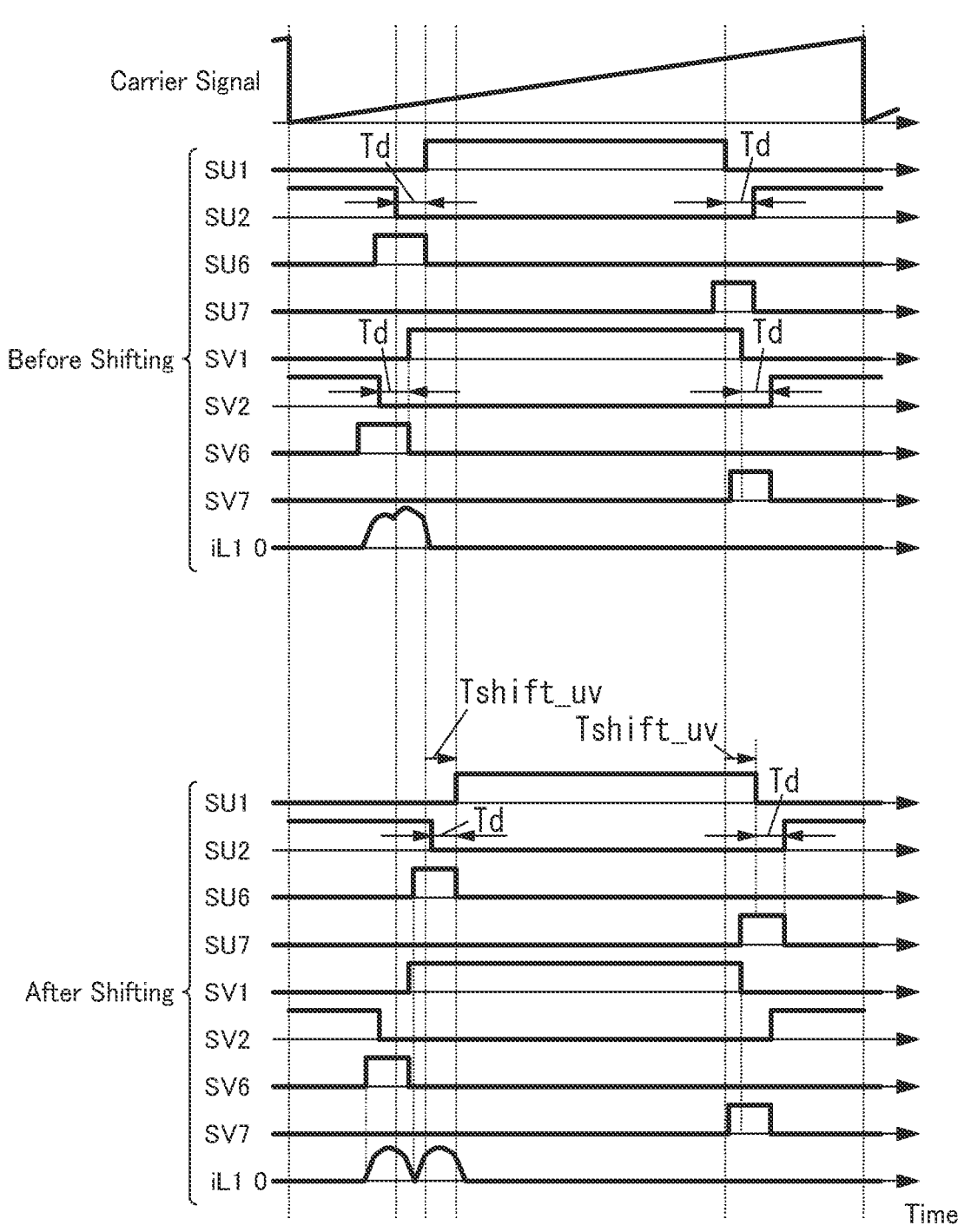
FIG. 5 is a timing chart illustrating how the power converter operates in a period corresponding to a range A1 shown in FIG. 4.

FIG. 5 is an exemplary timing chart for a period corresponding to the range A1 shown in FIG. 4. Specifically, the upper portion of FIG. 5 shows a timing chart of PWM signals SU1, SU2, SV1, SV2 that have not been shifted yet and the control signals SU6, SU7, SV6, SV7 in a situation where the controller 50 has determined that two-phase resonant currents (namely, U-phase and V-phase resonant currents) flow simultaneously. On the other hand, the lower portion of FIG. 5 shows a timing chart of PWM signals SU1, SU2, SV1, SV2, the control signals SU6, SU7, SV6, SV7, and the current iL1 in a situation where each of the PWM signal SU1 and the PWM signal SU2 has been shifted by the same additional time Tau. As can be seen from the waveform of the current iL1 shown in FIG. 5, the power converter 100 may reduce the overlap between the U-phase resonant current and the V-phase resonant current.

Next, an exemplary operation of the controller 50 in the period corresponding to the range A1 shown in FIG. 4 will be described with reference to FIGS. 5-8. In the following description, the amount of time of shifting (hereinafter referred to as a "shift time") by which the respective ON periods of the first switching element 1U and second switching element 2U of the switching circuit 10U are shifted will be hereinafter designated by Tus, the shift time by which the respective ON periods of the first switching element 1V and second switching element 2V of the switching circuit 10V are shifted will be hereinafter designated by Tvs, and the shift time by which the respective ON periods of the first switching element 1W and second switching element 2W of the switching circuit 10W are shifted will be hereinafter designated by Tws for the sake of convenience of description. When shifting the respective ON periods of the PWM signal SU1 and the PWM signal SU2, the controller 50 does not change the duties of the PWM signal SU1 and the PWM signal SU2 in one cycle of the carrier signal. When shifting the respective ON periods of the PWM signal SV1 and the PWM signal SV2, the controller 50 does not change the duties of the PWM signal SV1 and the PWM signal SV2 in one cycle of the carrier signal. When shifting the respective ON periods of the PWM signal SW1 and the PWM signal SW2, the controller 50 does not change the duties of the PWM signal SW1 and the PWM signal SW2 in one cycle of the carrier signal. Furthermore, the time width of the high-level period of the PWM signal SU1 for the first switching element 1U will be hereinafter designated by Tuon, the time width of the high-level period of the PWM signal SV1 for the first switching element 1V will be hereinafter designated by Tvon, and the time width of the high-level period of the PWM signal SW1 for the first switching element 1W will be hereinafter designated by Twon. The ON period of the first switching element 1U corresponds one to one to the high-level period of the PWM signal SU1. The ON period of the first switching element 1V corresponds one to one to the high-level period of the PWM signal SV1. The ON period of the first switching element 1W corresponds one to one to the high-level period of the PWM signal SW1. Furthermore, the durations of overlap when two-phase resonant currents (namely, the U-phase and V-phase resonant currents, the U-phase and W-phase resonant currents, or the V-phase and W-phase resonant currents) actually overlap with each other will be hereinafter designated by Tov_uv, Tov_uw, and Tov_vw, respectively.

The controller 50 may, for example, generate the PWM signal SU1, the PWM signal SV1, and the PWM signal SW1 every cycle of the carrier signal, and then perform first processing for reducing the overlap between the U-phase resonant current and the V-phase resonant current, second processing for reducing the overlap between the U-phase resonant current and the W-phase resonant current, and third processing for reducing the overlap between the V-phase resonant current and the W-phase resonant current.

(3-1-1) First Processing

Figure 6:
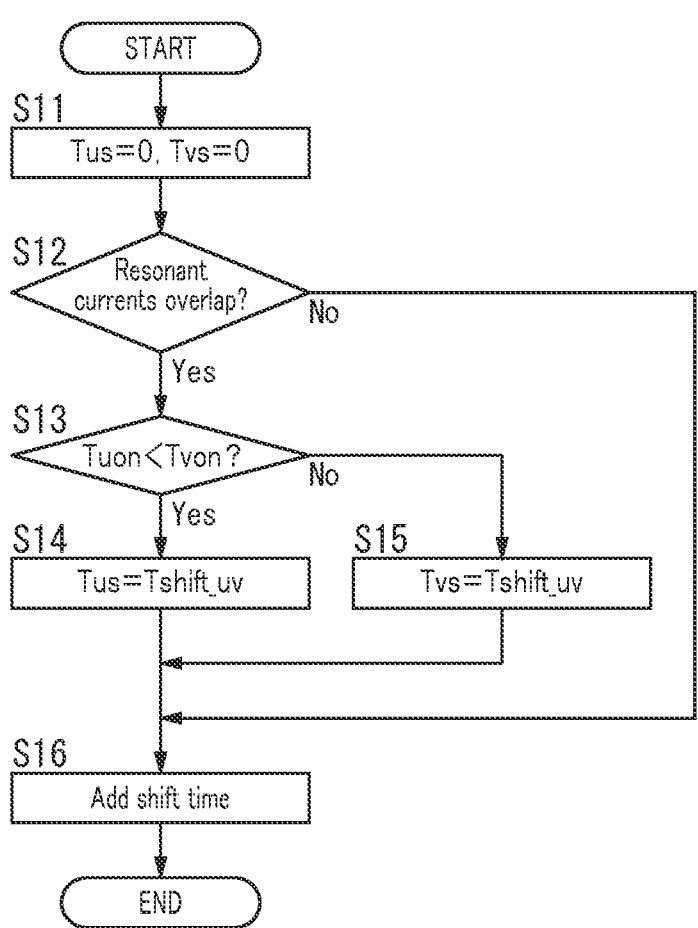
FIG. 6 is a flowchart illustrating how a controller of the power converter operates.

The first processing will be described with reference to FIG. 6.

The controller 50 sets the shift time Tus and the shift time Tvs at an initial value (=0) (in Step S11).

After performing Step S11, the controller 50 determines whether a U-phase resonant current corresponding to the switching circuit 10U and a V-phase resonant current corresponding to the switching circuit 10V flow simultaneously through the resonant inductor L1 (i.e., overlap with each other) (in Step S12).

When determining that the U-phase resonant current and the V-phase resonant current overlap with each other (if the answer is YES in Step S12), the controller 50 determines whether Tuon<Tvon is satisfied (in Step S13).

When determining that Tuon<Tvon is satisfied (if the answer is YES in Step S13), the controller 50 sets Tus at the predetermined period Tshift_uv (in Step S14), and then adds Tus every time the signal level of the PWM signal SU1 changes (i.e., at the beginning t3 and end of the high-level period in which the signal level is high), and adds Tvs (=0) every time the signal level of the PWM signal SV1 changes (i.e., at the beginning t7 and end of the high-level period in which the signal level is high) (in Step S16). In this manner, the controller 50 shifts each timing, when the signal level of the PWM signal SU1 changes, for the predetermined period Tshift_uv in a direction in which the timing is delayed. That is to say, the controller 50 shifts the ON period of the first switching element 1U in a predetermined direction (i.e., a direction in which the ON period is postponed on the time axis).

On the other hand, when determining in Step S13 that Tuon<Tvon is not satisfied (i.e., if the answer is NO in Step S13), the controller 50 sets Tvs at the predetermined period Tshift_uv (in Step S15), and then adds Tus (=0) every time the signal level of the PWM signal SU1 changes, and adds Tvs every time the signal level of the PWM signal SV1 changes (in Step S16). In this manner, the controller 50 shifts each timing when the signal level of the PWM signal SV1 changes for the predetermined period Tshift_uv in the direction in which the timing is delayed on the time axis. That is to say, the controller 50 shifts the ON period of the first switching element 1V in a predetermined direction (i.e., a direction in which the ON period is postponed on the time axis). Note that when determining in Step S12 that the U-phase resonant current and the V-phase resonant current do not overlap with each other (if the answer is NO in Step S12), the controller 50 adds Tus (=0) every time the signal level of the PWM signal SU1 changes and adds Tvs (=0) every time the signal level of the PWM signal SV1 changes (in Step S16).

Using the PWM signal SU1 and the PWM signal SV1 subjected to Step S16, the controller 50 controls the first switching element 1U and the first switching element 1V.

Thus, in the first processing, when determining that the U-phase resonant current and the V-phase resonant current overlap with each other, the controller 50 shifts one of the PWM signal SU1 or the PWM signal SV1, of which the high-level period has the shorter time width than the other PWM signal SU1, SV1. Note that Tshift_uv is a predetermined period. The power converter 100 according to the first embodiment may reduce the overlap between the U-phase resonant current and the V-phase resonant current by defining Tshift_uv to be a period Tov_uv in which the two-phase resonant currents (namely, the U-phase resonant current and the V-phase resonant current) actually overlap with each other.

(3-1-2) Second Processing

Figure 7:
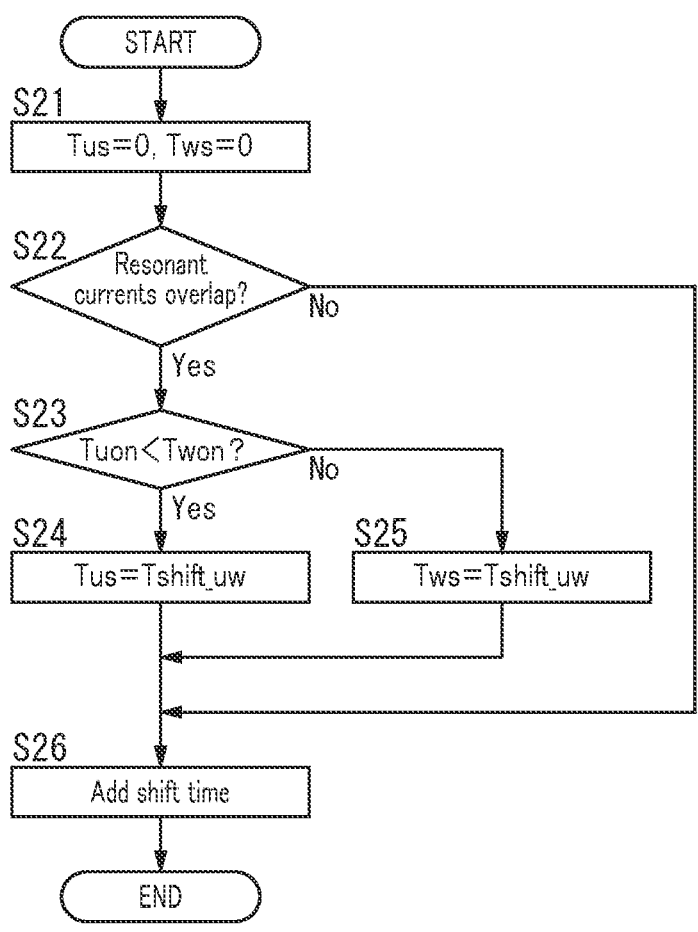
FIG. 7 is a flowchart illustrating how the controller of the power converter operates.

The second processing will be described with reference to FIG. 7.

The controller 50 sets the shift time Tus and the shift time Tws at an initial value (=0) (in Step S21).

After performing Step S21, the controller 50 determines whether a U-phase resonant current corresponding to the switching circuit 10U and a W-phase resonant current corresponding to the switching circuit 10W flow simultaneously through the resonant inductor L1 (in Step S22).

When determining that the U-phase resonant current and the W-phase resonant current overlap with each other (if the answer is YES in Step S22), the controller 50 determines whether Tuon<Twon is satisfied (in Step S23).

When determining that Tuon<Twon is satisfied (if the answer is YES in Step S23), the controller 50 sets Tus at the predetermined period Tshift_uw (in Step S24), and then adds Tus every time the signal level of the PWM signal SU1 changes (i.e., at the beginning t3 and end of the high-level period), and adds Tws (=0) every time the signal level of the PWM signal SW1 changes (i.e., at the beginning t11 and end of the high-level period) (in Step S26). In this manner, the controller 50 shifts each timing, when the signal level of the PWM signal SU1 changes, for the predetermined period Tshift_uw in a direction in which the timing is delayed on the time axis. That is to say, the controller 50 shifts the ON period of the first switching element 1U in a predetermined direction (i.e., a direction in which the ON period is postponed on the time axis).

On the other hand, when determining in Step S23 that Tuon<Twon is not satisfied (i.e., if the answer is NO in Step S23), the controller 50 sets Tws at the predetermined period Tshift_uw (in Step S25), and then adds Tus (=0) every time the signal level of the PWM signal SU1 changes, and adds Tws every time the signal level of the PWM signal SW1 changes (in Step S26). In this manner, the controller 50 shifts each timing when the signal level of the PWM signal SW1 changes for the predetermined period Tshift_uw in the direction in which the timing is delayed on the time axis. That is to say, the controller 50 shifts the ON period of the first switching element 1W in a predetermined direction (i.e., a direction in which the ON period is postponed on the time axis). Note that when determining in Step S22 that the U-phase resonant current and the W-phase resonant current do not overlap with each other (if the answer is NO in Step S22), the controller 50 adds Tus (=0) every time the signal level of the PWM signal SU1 changes and adds Tws (=0) every time the signal level of the PWM signal SW1 changes (in Step S26).

Using the PWM signal SU1 and the PWM signal SW1 subjected to Step S26, the controller 50 controls the first switching element 1U and the first switching element 1W.

Thus, in the second processing, when determining that the U-phase resonant current and the W-phase resonant current overlap with each other, the controller 50 shifts one of the PWM signal SU1 or the PWM signal SW1, of which the high-level period has the shorter time width than the other PWM signal SU1, SW1. Note that Tshift_uw is a predetermined period. The power converter 100 according to the first embodiment may reduce the overlap between the U-phase resonant current and the W-phase resonant current by defining Tshift_uw to be a period Tov_uw in which the two-phase resonant currents (namely, the U-phase resonant current and the W-phase resonant current) actually overlap with each other.

(3-1-3) Third Processing

Figure 8:
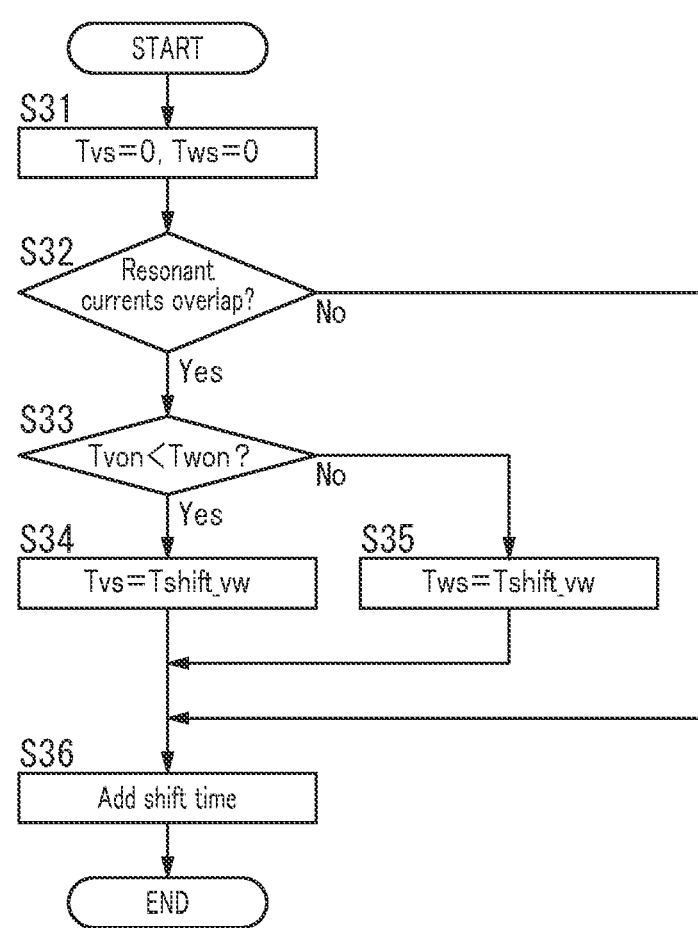
FIG. 8 is a flowchart illustrating how the controller of the power converter operates.

The third processing will be described with reference to FIG. 8.

The controller 50 sets the shift time Tvs and the shift time Tws at an initial value (=0) (in Step S31).

After performing Step S31, the controller 50 determines whether a V-phase resonant current corresponding to the switching circuit 10V and a W-phase resonant current corresponding to the switching circuit 10W flow simultaneously through the resonant inductor L1 (in Step S32).

When determining that the V-phase resonant current and the W-phase resonant current overlap with each other (if the answer is YES in Step S32), the controller 50 determines whether Tvon<Twon is satisfied (in Step S33).

When determining that Tvon<Twon is satisfied (if the answer is YES in Step S33), the controller 50 sets Tvs at the predetermined period Tshift_vw (in Step S34), and then adds Tvs every time the signal level of the PWM signal SV1 changes (i.e., at the beginning t7 and end of the high-level period), and adds Tws (=0) every time the signal level of the PWM signal SW1 changes (i.e., at the beginning t11 and end of the high-level period) (in Step S36). In this manner, the controller 50 shifts each timing, when the signal level of the PWM signal SV1 changes, for the predetermined period Tshift_vw in a direction in which the timing is delayed on the time axis. That is to say, the controller 50 shifts the ON period of the first switching element 1V in a predetermined direction (i.e., a direction in which the ON period is postponed on the time axis).

On the other hand, when determining in Step S33 that Tvon<Twon is not satisfied (i.e., if the answer is NO in Step S33), the controller 50 sets Tws at the predetermined period Tshift_vw (in Step S35), and then adds Tvs (=0) every time the signal level of the PWM signal SV1 changes, and adds Tws every time the signal level of the PWM signal SW1 changes (in Step S36). In this manner, the controller 50 shifts each timing when the signal level of the PWM signal SW1 changes for the predetermined period Tshift_vw in the direction in which the timing is delayed on the time axis. That is to say, the controller 50 shifts the ON period of the first switching element 1W in a predetermined direction (i.e., a direction in which the ON period is postponed on the time axis). Note that when determining in Step S32 that the V-phase resonant current and the W-phase resonant current do not overlap with each other (if the answer is NO in Step S32), the controller 50 adds Tvs (=0) every time the signal level of the PWM signal SV1 changes and adds Tws (=0) every time the signal level of the PWM signal SW1 changes (in Step S36).

Using the PWM signal SV1 and the PWM signal SW1 subjected to Step S36, the controller 50 controls the first switching element 1V and the first switching element 1W.

Thus, in the third processing, when determining that the V-phase resonant current and the W-phase resonant current overlap with each other, the controller 50 shifts one of the PWM signal SV1 or the PWM signal SW1, of which the high-level period has the shorter time width than the other PWM signal SV1, SW1. Note that Tshift_vw is a predetermined period. The power converter 100 according to the first embodiment may reduce the overlap between the V-phase resonant current and the W-phase resonant current by defining Tshift_vw to be a period Tov_vw in which the two-phase resonant currents (namely, the V-phase resonant current and the W-phase resonant current) actually overlap with each other.

(3-2) Operation of Controller in Period Corresponding to Range A2 Shown in FIG. 4

Figure 9:
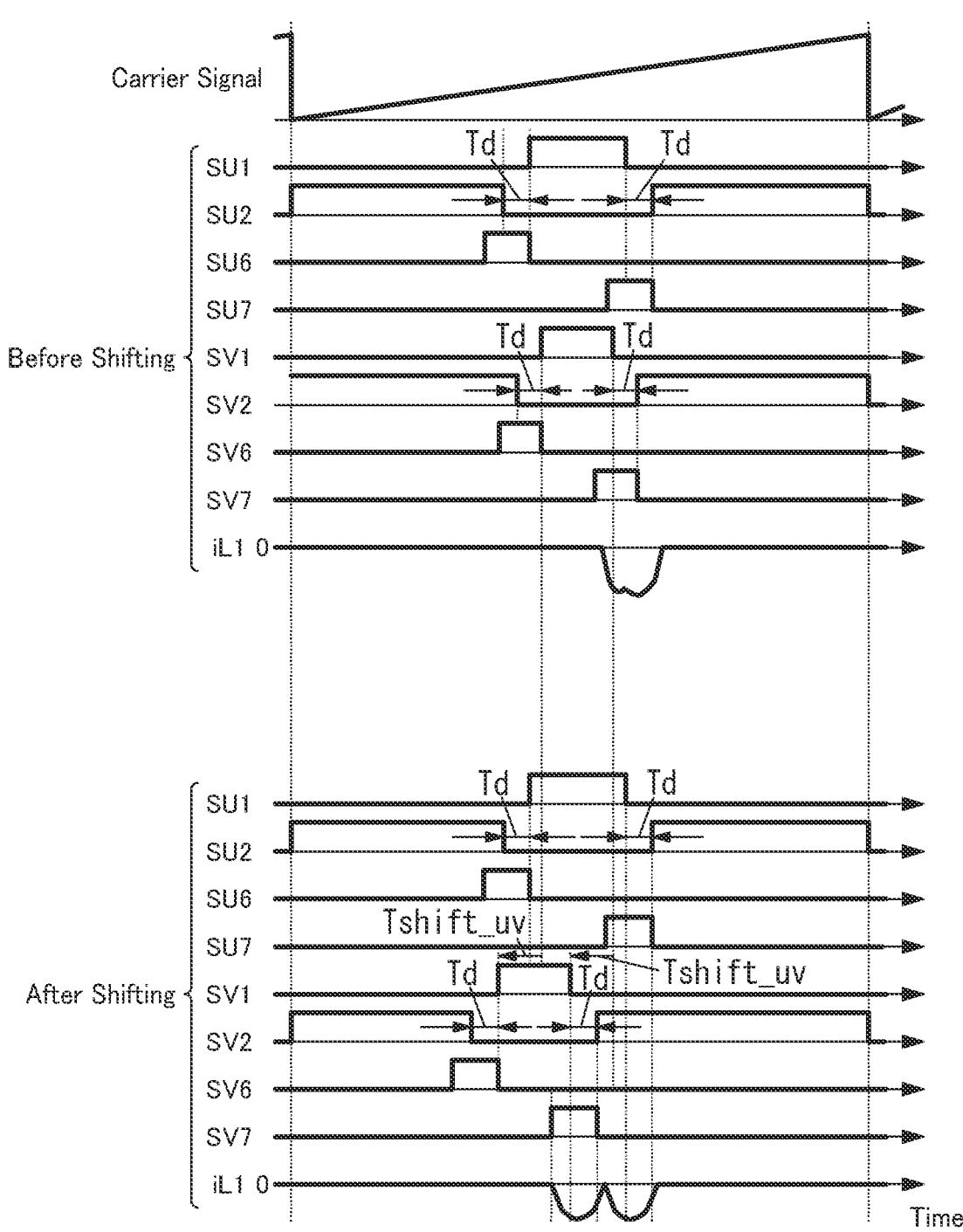
FIG. 9 is a timing chart illustrating how the power converter operates in a period corresponding to a range A2 shown in FIG. 4.

FIG. 9 is an exemplary timing chart for a period corresponding to the range A2 shown in FIG. 4. Specifically, the upper portion of FIG. 9 shows a timing chart of PWM signals SU1, SU2, SV1, SV2 that have not been shifted yet, the control signals SU6, SU7, SV6, SV7, and a current iL1 in a situation where the controller 50 has determined that two-phase resonant currents (namely, U-phase and V-phase resonant currents) flow simultaneously. On the other hand, the lower portion of FIG. 9 shows a timing chart of PWM signals SU1, SU2, SV1, SV2, the control signals SU6, SU7, SV6, SV7, and the current iL1 in a situation where each of the PWM signal SU1 and the PWM signal SU2 has been shifted by the same additional time Tau. As can be seen from the waveform of the current iL1 shown in FIG. 9, the power converter 100 may reduce the overlap between the U-phase resonant current and the V-phase resonant current.

Figure 10:
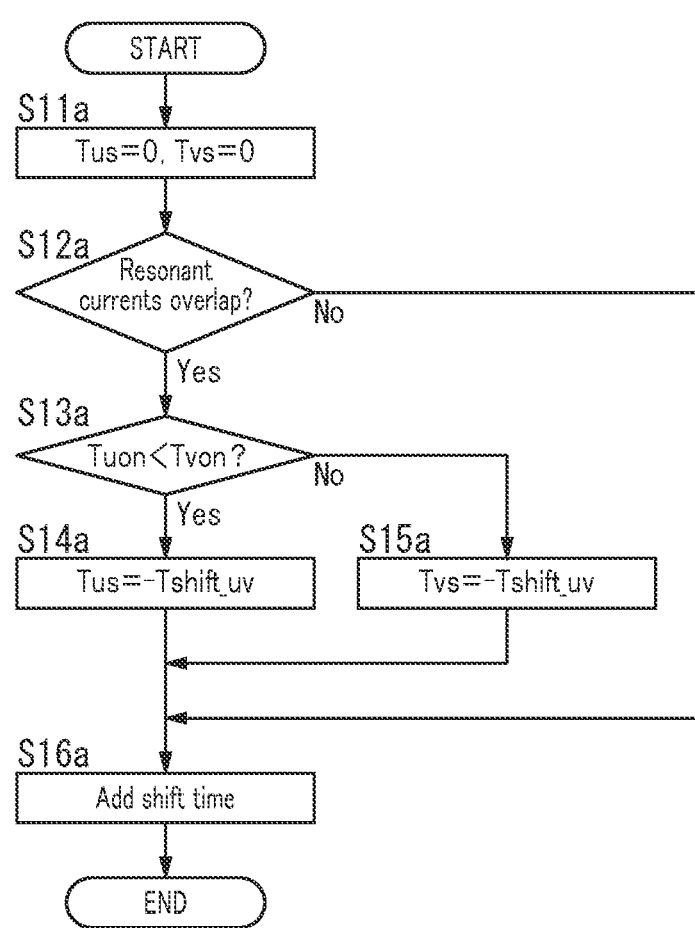
FIG. 10 is a flowchart illustrating how the controller of the power converter operates.
Figure 11:
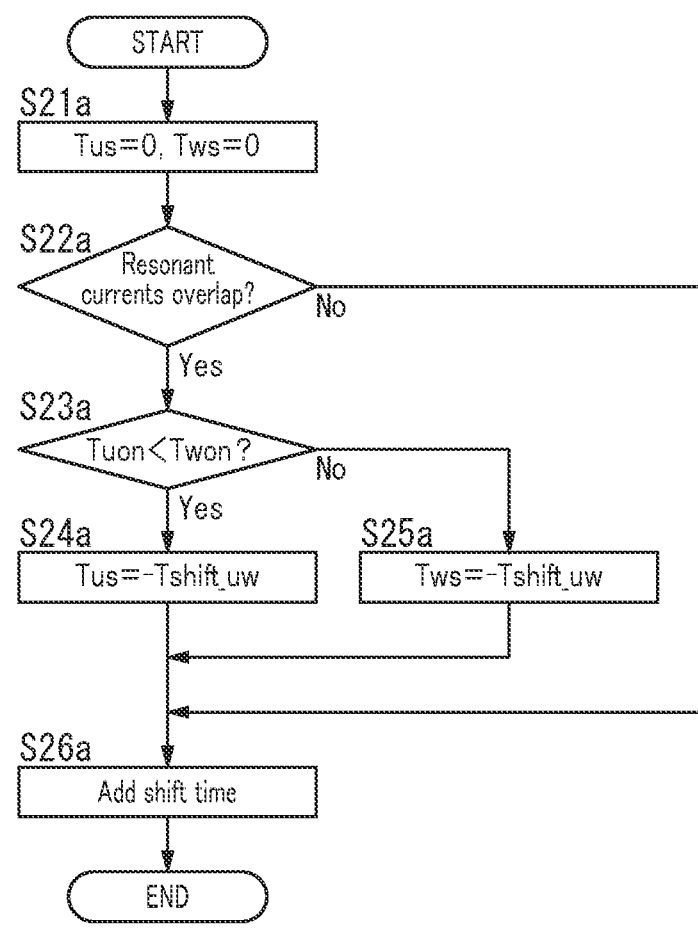
FIG. 11 is a flowchart illustrating how the controller of the power converter operates.
Figure 12:
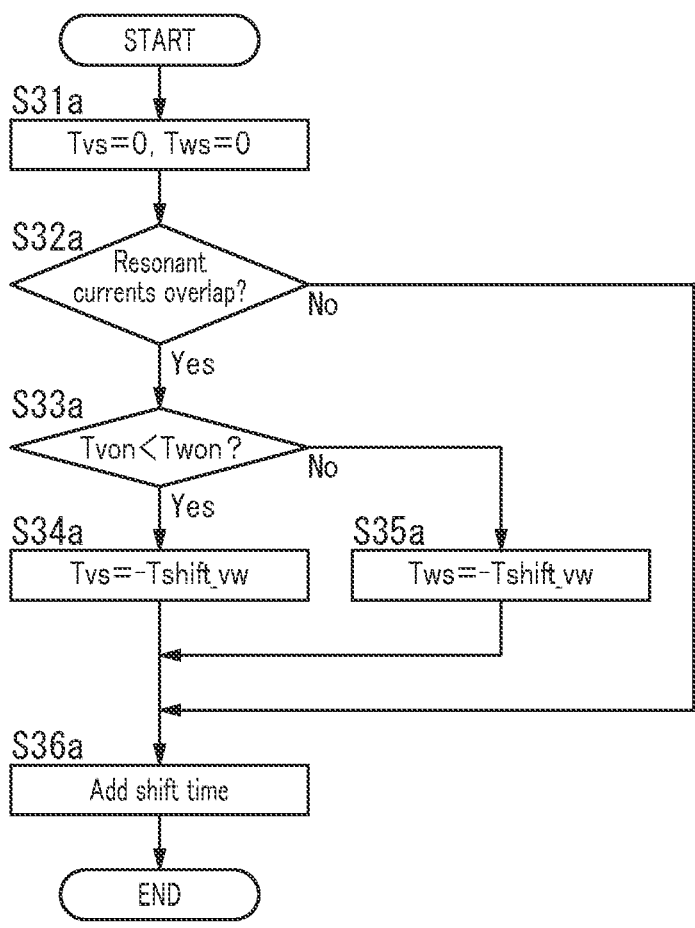
FIG. 12 is a flowchart illustrating how the controller of the power converter operates.

Next, an exemplary operation of the controller 50 in the period corresponding to the range A2 shown in FIG. 4 will be described with reference to FIGS. 10-12. Note that description of the same process steps as those of the exemplary operation of the controller 50 in the period corresponding to the range A1 shown in FIG. 4 will be omitted as appropriate herein.

The controller 50 may, for example, generate the PWM signal SU1, the PWM signal SV1, and the PWM signal SW1 every cycle of the carrier signal, and then perform first processing for reducing the overlap between the U-phase resonant current and the V-phase resonant current, second processing for reducing the overlap between the U-phase resonant current and the W-phase resonant current, and third processing for reducing the overlap between the V-phase resonant current and the W-phase resonant current.

(3-2-1) First Processing

The first processing will be described with reference to FIG. 10.

The controller 50 sets the shift time Tus and the shift time Tvs at an initial value (=0) (in Step S11*a*).

After performing Step S11*a*, the controller 50 determines whether a U-phase resonant current corresponding to the switching circuit 10U and a V-phase resonant current corresponding to the switching circuit 10V flow simultaneously through the resonant inductor L1 (i.e., overlap with each other) (in Step S12*a*).

When determining that the U-phase resonant current and the V-phase resonant current overlap with each other (if the answer is YES in Step S12*a*), the controller 50 determines whether Tuon<Tvon is satisfied (in Step S13*a*).

When determining that Tuon<Tvon is satisfied (if the answer is YES in Step S13*a*), the controller 50 sets Tus at −Tshift_uv (in Step S14*a*), and then adds Tus every time the signal level of the PWM signal SU1 changes (i.e., at the beginning and end of the high-level period in which the signal level is high), and adds Tvs (=0) every time the signal level of the PWM signal SV1 changes (i.e., at the beginning and end of the high-level period in which the signal level is high) (in Step S16*a*). In this manner, the controller 50 shifts each timing, when the signal level of the PWM signal SU1 changes, for−Tshift_uv in a direction in which the timing is delayed (in other words, shifts each timing for Tshift_uv in a direction in which the timing is advanced). That is to say, the controller 50 shifts the ON period of the first switching element 1U in a predetermined direction (i.e., a direction in which the ON period is advanced on the time axis).

On the other hand, when determining in Step S13*a* that Tuon<Tvon is not satisfied (i.e., if the answer is NO in Step S13*a*), the controller 50 sets Tvs at −Tshift_uv (in Step S15*a*), and then adds Tus (=0) every time the signal level of the PWM signal SU1 changes, and adds Tvs every time the signal level of the PWM signal SV1 changes (in Step S16*a*). Thus, the controller 50 shifts each timing when the signal level of the PWM signal SV1 changes for −Tshift_uv in the direction in which the timing is delayed on the time axis (in other words, shifts each timing for Tshift_uv in a direction in which the timing is advanced on the time axis). That is to say, the controller 50 shifts the ON period of the first switching element 1V in a predetermined direction (i.e., a direction in which the ON period is advanced on the time axis). Note that when determining in Step S12*a* that the U-phase resonant current and the V-phase resonant current do not overlap with each other (if the answer is NO in Step S12*a*), the controller 50 adds Tus (=0) every time the signal level of the PWM signal SU1 changes and adds Tvs (=0) every time the signal level of the PWM signal SV1 changes (in Step S16*a*).

Using the PWM signal SU1 and the PWM signal SV1 subjected to Step S16*a*, the controller 50 controls the first switching element 1U and the first switching element 1V.

Thus, in the first processing, when determining that the U-phase resonant current and the V-phase resonant current overlap with each other, the controller 50 shifts one of the PWM signal SU1 or the PWM signal SV1, of which the high-level period has the shorter time width than the other PWM signal SU1, SV1. Note that Tshift_uv is a predetermined period. The power converter 100 according to the first embodiment may reduce the overlap between the U-phase resonant current and the V-phase resonant current by defining Tshift_uv to be a period Tov_uv in which the two-phase resonant currents (namely, the U-phase resonant current and the V-phase resonant current) actually overlap with each other.

(3-2-2) Second Processing

The second processing will be described with reference to FIG. 11.

The controller 50 sets the shift time Tus and the shift time Tws at an initial value (=0) (in Step S21*a*).

After performing Step S21*a*, the controller 50 determines whether a U-phase resonant current corresponding to the switching circuit 10U and a W-phase resonant current corresponding to the switching circuit 10W flow simultaneously through the resonant inductor L1 (in Step S22*a*).

When determining that the U-phase resonant current and the W-phase resonant current overlap with each other (if the answer is YES in Step S22*a*), the controller 50 determines whether Tuon<Twon is satisfied (in Step S23*a*).

When determining that Tuon<Twon is satisfied (if the answer is YES in Step S23*a*), the controller 50 sets Tus at −Tshift_uw (in Step S24*a*), and then adds Tus every time the signal level of the PWM signal SU1 changes (i.e., at the beginning and end of the high-level period), and adds Tws (=0) every time the signal level of the PWM signal SW1 changes (i.e., at the beginning and end of the high-level period) (in Step S26*a*). In this manner, the controller 50 shifts each timing, when the signal level of the PWM signal SU1 changes, for −Tshift_uw in a direction in which the timing is delayed on the time axis (in other words, shifts each timing for Tshift_uw in a direction in which the timing is advanced on the time axis). That is to say, the controller 50 shifts the ON period of the first switching element 1U in a predetermined direction (i.e., a direction in which the ON period is advanced on the time axis).

On the other hand, when determining in Step S23*a* that Tuon<Twon is not satisfied (i.e., if the answer is NO in Step S23*a*), the controller 50 sets Tws at −Tshift_uw (in Step S25*a*), and then adds Tus (=0) every time the signal level of the PWM signal SU1 changes, and adds Tws every time the signal level of the PWM signal SW1 changes (in Step S26*a*). Thus, the controller 50 shifts each timing when the signal level of the PWM signal SW1 changes for −Tshift_uw in the direction in which the timing is delayed on the time axis (in other words, shifts each timing for Tshift_uv in a direction in which the timing is advanced on the time axis). That is to say, the controller 50 shifts the ON period of the first switching element 1W in a predetermined direction (i.e., a direction in which the ON period is advanced on the time axis). Note that when determining in Step S22*a* that the U-phase resonant current and the W-phase resonant current do not overlap with each other (if the answer is NO in Step S22*a*), the controller 50 adds Tus (=0) every time the signal level of the PWM signal SU1 changes and adds Tws (=0) every time the signal level of the PWM signal SW1 changes (in Step S26*a*).

Using the PWM signal SU1 and the PWM signal SW1 subjected to Step S26*a*, the controller 50 controls the first switching element 1U and the first switching element 1W.

Thus, in the second processing, when determining that the U-phase resonant current and the W-phase resonant current overlap with each other, the controller 50 shifts one of the PWM signal SU1 or the PWM signal SW1, of which the high-level period has the shorter time width than the other PWM signal SU1, SW1. Note that Tshift_uw is a predetermined period. The power converter 100 according to the first embodiment may reduce the overlap between the U-phase resonant current and the W-phase resonant current by defining Tshift_uw to be a period Tov_uw in which the two-phase resonant currents (namely, the U-phase resonant current and the W-phase resonant current) actually overlap with each other.

(3-2-3) Third Processing

The third processing will be described with reference to FIG. 12.

The controller 50 sets the shift time Tvs and the shift time Tws at an initial value (=0) (in Step S31*a*).

After performing Step S31*a*, the controller 50 determines whether a V-phase resonant current corresponding to the switching circuit 10V and a W-phase resonant current corresponding to the switching circuit 10W flow simultaneously through the resonant inductor L1 (in Step S32*a*).

When determining that the V-phase resonant current and the W-phase resonant current overlap with each other (if the answer is YES in Step S32*a*), the controller 50 determines whether Tvon<Twon is satisfied (in Step S33*a*).

When determining that Tvon<Twon is satisfied (if the answer is YES in Step S33*a*), the controller 50 sets Tvs at −Tshift_vw (in Step S34*a*), and then adds Tvs every time the signal level of the PWM signal SV1 changes (i.e., at the beginning and end of the high-level period), and adds Tws (=0) every time the signal level of the PWM signal SW1 changes (i.e., at the beginning and end of the high-level period) (in Step S36*a*). In this manner, the controller 50 shifts each timing, when the signal level of the PWM signal SV1 changes, for −Tshift_vw in a direction in which the timing is delayed on the time axis (in other words, shifts each timing for Tshift_uv in a direction in which the timing is advanced on the time axis). That is to say, the controller 50 shifts the ON period of the first switching element TV in a predetermined direction (i.e., a direction in which the ON period is advanced on the time axis).

On the other hand, when determining in Step S33*a* that Tvon<Twon is not satisfied (i.e., if the answer is NO in Step S33*a*), the controller 50 sets Tws at −Tshift_vw (in Step S35*a*), and then adds Tvs (=0) every time the signal level of the PWM signal SV1 changes, and adds Tws every time the signal level of the PWM signal SW1 changes (in Step S36*a*). Thus, the controller 50 shifts each timing when the signal level of the PWM signal SW1 changes for −Tshift_vw in the direction in which the timing is delayed on the time axis (in other words, shifts each timing for Tshift_uv in a direction in which the timing is advanced on the time axis). That is to say, the controller 50 shifts the ON period of the first switching element 1W in a predetermined direction (i.e., a direction in which the ON period is advanced on the time axis). Note that when determining in Step S32*a* that the V-phase resonant current and the W-phase resonant current do not overlap with each other (if the answer is NO in Step S32*a*), the controller 50 adds Tvs (=0) every time the signal level of the PWM signal SV1 changes and adds Tws (=0) every time the signal level of the PWM signal SW1 changes (in Step S36*a*).

Using the PWM signal SV1 and the PWM signal SW1 subjected to Step S36*a*, the controller 50 controls the first switching element 1V and the first switching element 1W.

Thus, in the third processing, when determining that the V-phase resonant current and the W-phase resonant current overlap with each other, the controller 50 shifts one of the PWM signal SV1 or the PWM signal SW1, of which the high-level period has the shorter time width than the other PWM signal SV1, SW1. Note that Tshift_vw is a predetermined period. The power converter 100 according to the first embodiment may reduce the overlap between the V-phase resonant current and the W-phase resonant current by defining Tshift_vw to be a period Tov_vw in which the two-phase resonant currents (namely, the V-phase resonant current and the W-phase resonant current) actually overlap with each other.

(4) Recapitulation

A power converter 100 according to the first embodiment includes a first DC terminal 31 and a second DC terminal 32, a power converter circuit 11, a plurality of AC terminals 41, a plurality of switches 8, a plurality of resonant capacitors 9, a resonant inductor L1, a capacitor C1, and a controller 50. The power converter circuit 11 includes a plurality of first switching elements 1 and a plurality of second switching elements 2. In the power converter circuit 11, a plurality of switching circuits 10, in each of which one of the plurality of first switching elements 1 and a corresponding one of the plurality of second switching elements 2 are connected one to one in series, are connected in parallel. In the power converter circuit 11, the plurality of first switching elements 1 are connected to the first DC terminal 31 and the plurality of second switching elements 2 are connected to the second DC terminal 32. The plurality of AC terminals 41 are provided one to one for the plurality of switching circuits 10, respectively. Each of the plurality of AC terminals 41 is connected to a connection node 3 between the first switching element 1 and the second switching element 2 of a corresponding one of the plurality of switching circuits 10. The plurality of switches 8 are provided one to one for the plurality of switching circuits 10, respectively. Each of the plurality of switches 8 has a first terminal thereof connected to the connection node 3 between the first switching element 1 and the second switching element 2 of a corresponding one of the plurality of switching circuits 10. The plurality of switches 8 have their respective second terminals connected in common to a common connection node 25. The plurality of resonant capacitors 9 are provided one to one for the plurality of switches 8, respectively. Each of the plurality of resonant capacitors 9 is connected between the first terminal of a corresponding one of the plurality of switches 8 and the second DC terminal 32. The resonant inductor L1 has a first terminal and a second terminal. In the resonant inductor L1, the first terminal of the resonant inductor L1 is connected to the common connection node 25. The capacitor C1 is connected between the second terminal of the resonant inductor L1 and the second DC terminal 32. The controller 50 controls the plurality of first switching elements 1, the plurality of second switching elements 2, and the plurality of switches 8. When determining that two-phase resonant currents corresponding to two switching circuits 10 belonging to the plurality of switching circuits 10 flow simultaneously through the resonant inductor L1, the controller 50 performs control of shifting respective ON periods of the first switching element 1 and the second switching element 2 in one switching circuit 10 out of the two switching circuits 10. This allows the power converter 100 to reduce the chances of two-phase resonant currents flowing simultaneously through the resonant inductor L1, thus enabling making soft switching with more reliability. More specifically, the power converter 100 according to the first embodiment adopts a configuration in which the same resonant inductor L1 is connected in common to the plurality of switching circuits and yet may reduce the chances of two-phase resonant currents flowing simultaneously through the resonant inductor L1 and thereby enable making zero-voltage soft switching. In addition, the power converter 100 according to the first embodiment reduces the chances of two-phase resonant currents flowing simultaneously through the resonant inductor L1, thus reducing the chances of generating heat and causing loss due to an increase in the maximum value of the resonant current.

In addition, the description of the first embodiment also discloses the following control method.

The control method is a method for controlling a power converter 100. The power converter 100 includes a first DC terminal 31 and a second DC terminal 32, a power converter circuit 11, a plurality of AC terminals 41, a plurality of switches 8, a plurality of resonant capacitors 9, a resonant inductor L1, and a capacitor C1. The power converter circuit 11 includes a plurality of first switching elements 1 and a plurality of second switching elements 2. In the power converter circuit 11, a plurality of switching circuits 10, in each of which one of the plurality of first switching elements 1 and a corresponding one of the plurality of second switching elements 2 are connected one to one in series, are connected in parallel. In the power converter circuit 11, the plurality of first switching elements 1 are connected to the first DC terminal 31 and the plurality of second switching elements 2 are connected to the second DC terminal 32. The plurality of AC terminals 41 are provided one to one for the plurality of switching circuits 10, respectively. Each of the plurality of AC terminals 41 is connected to a connection node 3 between the first switching element 1 and the second switching element 2 of a corresponding one of the plurality of switching circuits 10. The plurality of switches 8 are provided one to one for the plurality of switching circuits 10, respectively. Each of the plurality of switches 8 has a first terminal thereof connected to the connection node 3 between the first switching element 1 and the second switching element 2 of a corresponding one of the plurality of switching circuits 10. The plurality of switches 8 have their respective second terminals connected in common to a common connection node 25. The resonant inductor L1 has a first terminal and a second terminal. In the resonant inductor L1, the first terminal of the resonant inductor L1 is connected to the common connection node 25. The plurality of resonant capacitors 9 are provided one to one for the plurality of switches 8, respectively. Each of the plurality of resonant capacitors 9 is connected between the first terminal of a corresponding one of the plurality of switches 8 and the second DC terminal 32. The capacitor C1 is connected between the second terminal of the resonant inductor L1 and the second DC terminal 32. The control method includes a first step and a second step. The first step includes determining whether two-phase resonant currents corresponding to two switching circuits 10 belonging to the plurality of switching circuits 10 flow simultaneously through the resonant inductor L1. The second step includes performing, when determining, in the first step, that the two-phase resonant currents flow simultaneously through the resonant inductor L1, control of shifting respective ON periods of the first switching element 1 and the second switching element 2 in one switching circuit 10 out of the two switching circuits 10.

This control method may reduce the chances of two-phase resonant currents flowing simultaneously through the resonant inductor L1, thus enabling making soft switching (zero-voltage soft switching) with more reliability. In addition, this control method also reduces the chances of generating heat and causing loss due to an increase in the maximum value of the resonant current.

(First Variation of First Embodiment)

A power converter 100 according to a first variation of the first embodiment has the same circuit configuration as the power converter 100 according to the first embodiment (refer to FIG. 1), and therefore, illustration of its circuit diagram is omitted. Next, it will be described with reference to FIGS. 1, 13, and 14 how the power converter 100 according to the first variation of the first embodiment operates.

In the power converter 100 according to the first variation of the first embodiment, as well as the power converter 100 according to the first embodiment described above, when determining that two-phase resonant currents corresponding to two switching circuits 10 belonging to the plurality of switching circuits 10 flow simultaneously through the resonant inductor L1, the controller 50 also performs control of shifting respective ON periods of the first switching element 1 and the second switching element 2 in one switching circuit 10 out of the two switching circuits 10. In this case, in the power converter 100 according to the first variation, the controller 50 shifts each timing when the signal level of the PWM signal changes only in a direction in which the timing is advanced on the time axis in the period corresponding to the range A1 shown in FIG. 4. That is to say, the controller 50 shifts the respective ON periods of the first switching element 1 and the second switching element 2 in the one switching circuit 10 in a predetermined direction (i.e., a direction in which the ON periods are advanced on the time axis).

Figure 13:
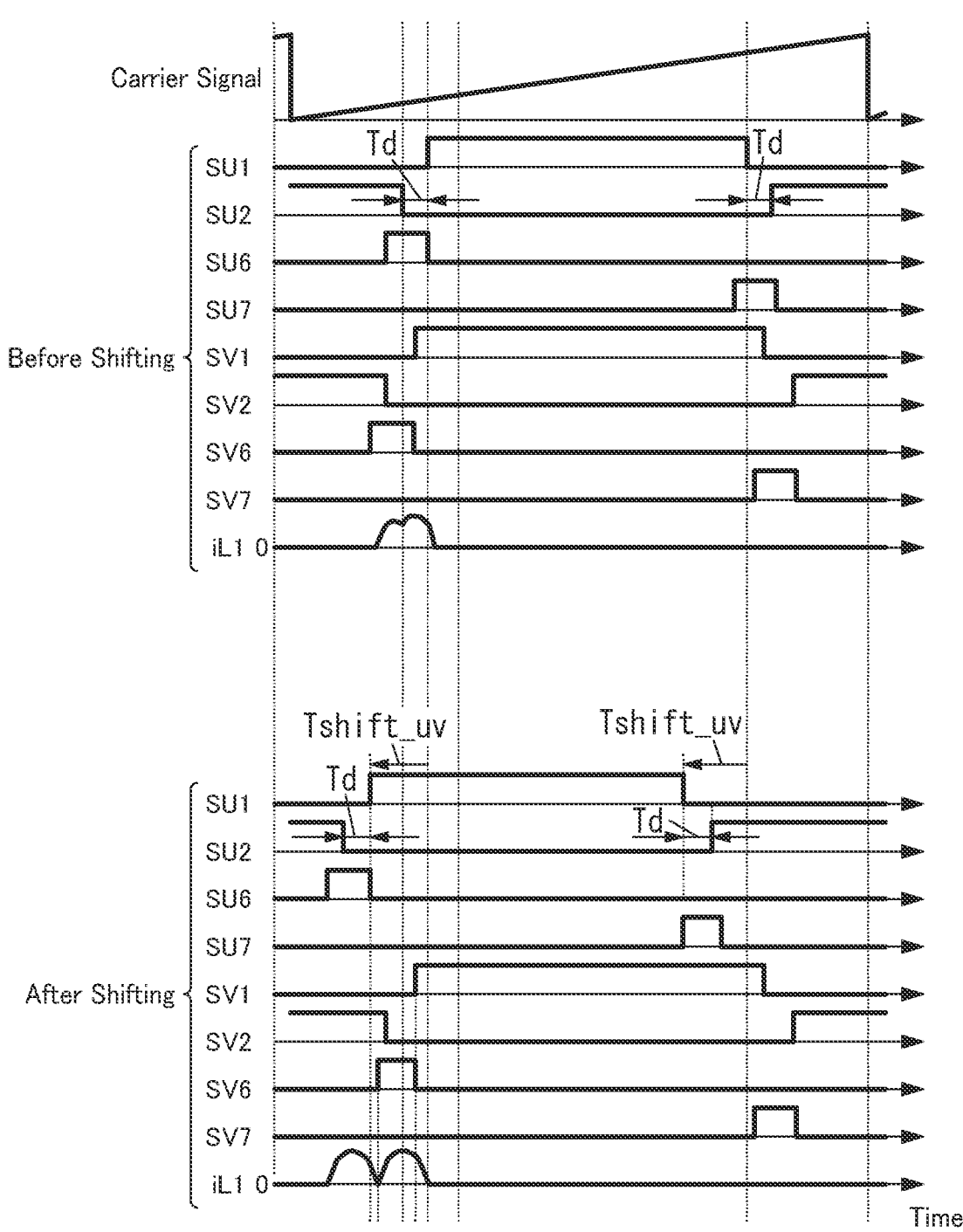
FIG. 13 is a timing chart illustrating how a power converter according to a first variation of the first embodiment operates.

As an example, the upper portion of FIG. 13 shows a timing chart of PWM signals SU1, SU2, SV1, SV2 that have not been shifted yet, the control signals SU6, SU7, SV6, SV7, and a current iL1 in a situation where the controller 50 has determined that two-phase resonant currents (namely, U-phase and V-phase resonant currents) flow simultaneously. On the other hand, the lower portion of FIG. 13 shows a timing chart of PWM signals SU1, SU2, SV1, SV2, the control signals SU6, SU7, SV6, SV7, and the current iL1 in a situation where each of the PWM signal SU1 and PWM signal SU2 has been shifted for the same predetermined period Tshift_uv. Note that in the power converter 100 according to the first variation, Tshift_uv is defined by further adding the predetermined period to the period Tov_uv in which the U-phase and V-phase resonant currents actually overlap with each other, thus enabling reducing the overlap between the U-phase resonant current and the V-phase resonant current.

In addition, in the power converter 100 according to the first variation, the controller 50 shifts each timing when the signal level of the PWM signal changes only in a direction in which the timing is delayed on the time axis in the period corresponding to the range A2 shown in FIG. 4. That is to say, the controller 50 shifts the respective ON periods of the first switching element 1 and the second switching element 2 in the one switching circuit 10 in a predetermined direction (i.e., a direction in which the ON periods are postponed on the time axis).

Figure 14:
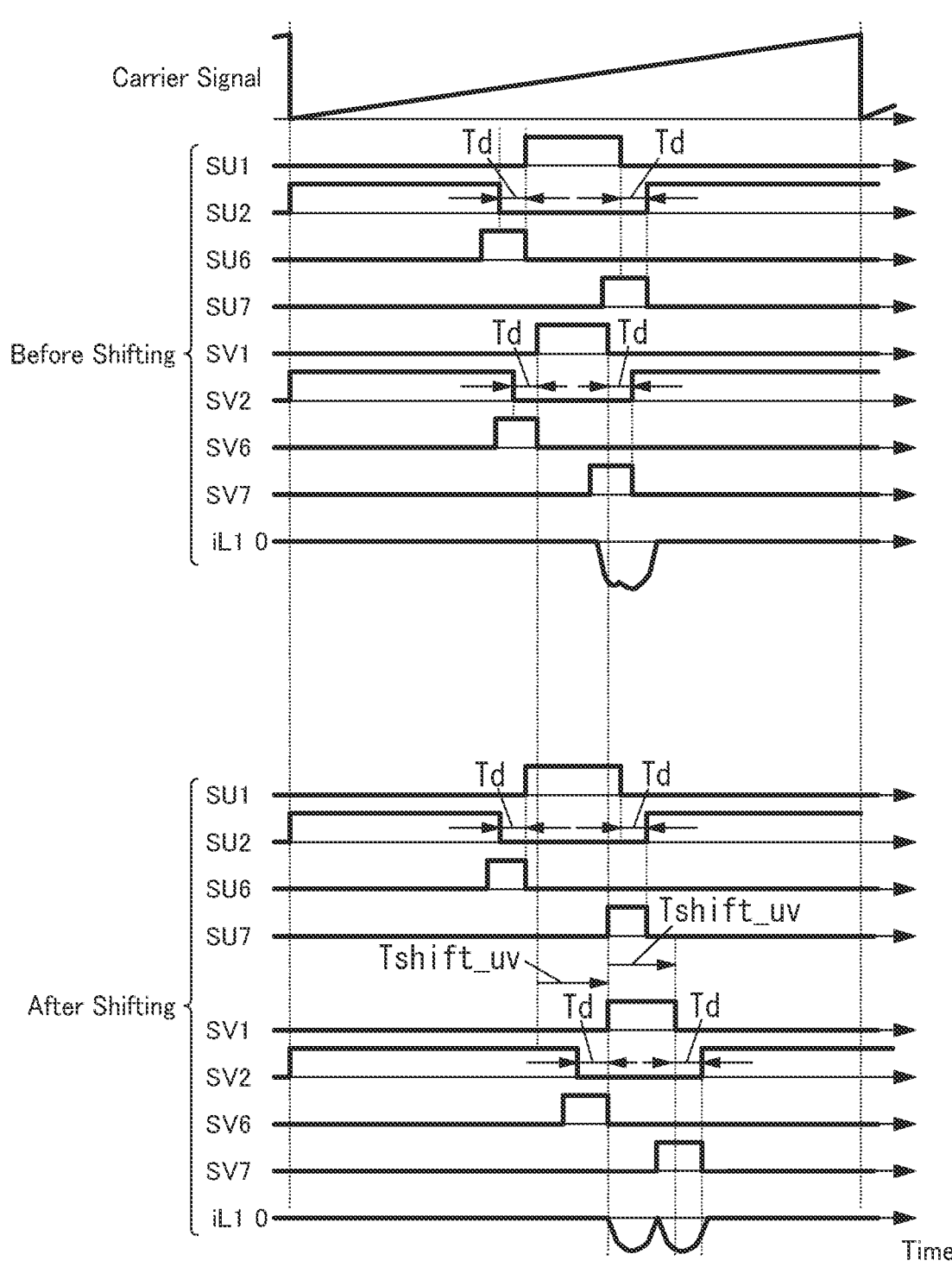
FIG. 14 is a timing chart illustrating how the power converter operates.

As an example, the upper portion of FIG. 14 shows a timing chart of PWM signals SU1, SU2, SV1, SV2 that have not been shifted yet, the control signals SU6, SU7, SV6, SV7, and a current iL1 in a situation where the controller 50 has determined that two-phase resonant currents (namely, U-phase and V-phase resonant currents) flow simultaneously. On the other hand, the lower portion of FIG. 14 shows a timing chart of PWM signals SU1, SU2, SV1, SV2, the control signals SU6, SU7, SV6, SV7, and the current iL1 in a situation where each of the PWM signal SV1 and PWM signal SV2 has been shifted for the same predetermined period Tshift_uv. Note that in the power converter 100 according to the first variation. Tshift_uv is defined by further adding the predetermined period to the period Tov_uv in which the two-phase resonant currents (namely, the U-phase and V-phase resonant currents) actually overlap with each other, thus enabling reducing the overlap between the U-phase resonant current and the V-phase resonant current.

The power converter 100 according to the first variation of the first embodiment, as well as the power converter 100 according to the first embodiment, may reduce the chances of two-phase resonant currents flowing simultaneously through the resonant inductor L1, thus enabling making soft switching (zero-voltage soft switching) with more reliability. In the foregoing description of the operation of the power converter 100 according to the first variation of the first embodiment, only a situation where a determination has been made that two-phase currents, namely, the U-phase resonant current and the V-phase resonant current, flow simultaneously has been described as an example. However, this is only an example and should not be construed as limiting. That is to say, although the description of an exemplary operation of the controller 50 in a situation where a determination has been made that any of the other pairs of resonant currents, namely, the U-phase and W-phase resonant currents or the V-phase and W-phase resonant currents, flow simultaneously is omitted, the controller 50 may also operate in the same way in such a situation where a decision has been that any of the other pairs of resonant currents, namely, the U-phase and W-phase resonant currents or the V-phase and W-phase resonant currents, flow simultaneously as in a situation where a determination has been made that the two-phase resonant current, namely, the U-phase and V-phase resonant currents, flow simultaneously. Likewise, it should be appreciated, unless otherwise stated, that in any of the other variations and embodiments to be described below, even if only an exemplary operation of the controller 50 in a situation where a determination has been made that the two-phase resonant current, namely, the U-phase and V-phase resonant currents, flow simultaneously is described, the controller 50 may also operate in the same way in a situation where a determination has been made that any of the other pairs of resonant currents, namely, the U-phase and W-phase resonant currents or the V-phase and W-phase resonant currents, flow simultaneously as in the situation where a determination has been made that the two-phase resonant current, namely, the U-phase and V-phase resonant currents, flow simultaneously.

(Second Variation of First Embodiment)

In a power converter 100 according to a second variation of the first embodiment, the controller 50 may be configured to perform, in combination, a first control mode and a second control mode either alternately or at a predetermined ratio. Specifically, the first control mode herein refers to a mode in which the controller 50 shifts the respective ON periods of the first switching element 1 and the second switching element 2 in a direction in which the ON periods are postponed on the time axis in the same way as the controller 50 of the power converter 100 according to the first embodiment. The second control mode herein refers to a mode in which the controller 50 shifts the respective ON periods of the first switching element 1 and the second switching element 2 in a direction in which the ON periods are advanced on the time axis in the same way as the controller 50 of the power converter 100 according to the first variation.

Figure 15:
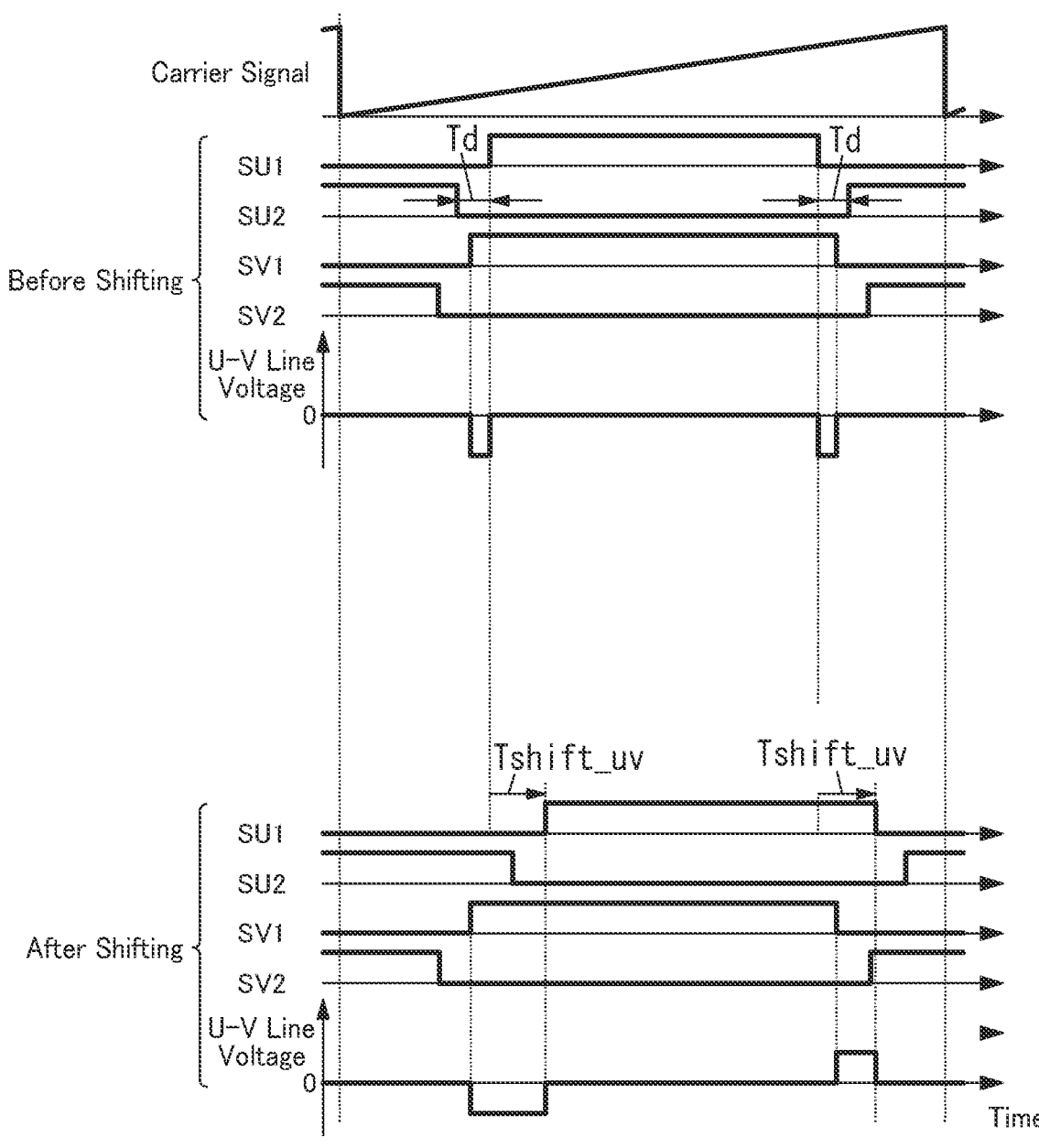
FIG. 15 illustrates how the power converter operates.

If the controller 50 performs the first control mode, the line voltage (U-V line voltage) between the U-phase and the V-phase changes as shown in FIG. 15 before and after the ON period of the first switching element 1U is shifted.

Figure 16:
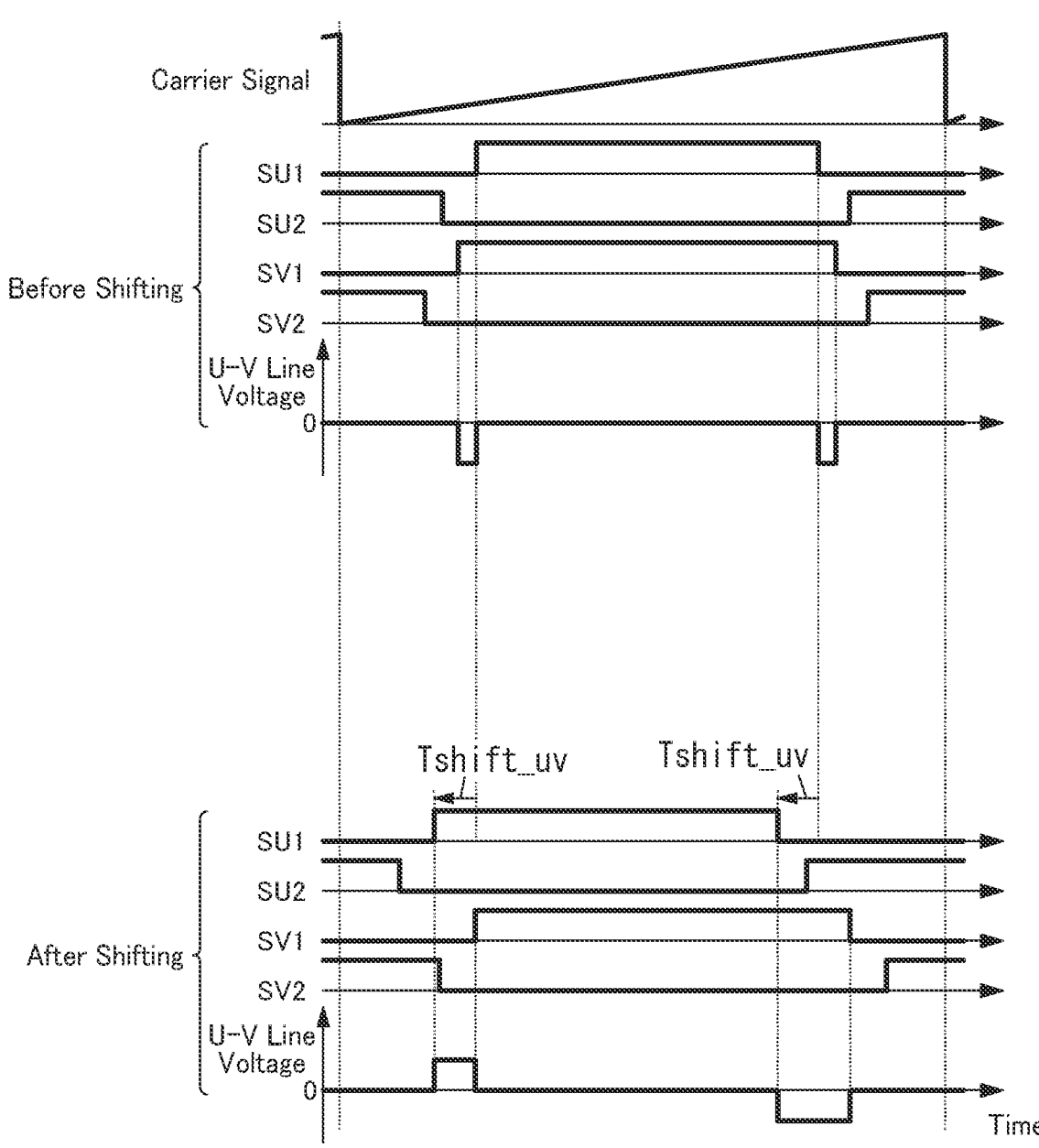
FIG. 16 illustrates how the power converter operates.

On the other hand, if the controller 50 performs the second control mode, the inter-phase voltage between the U-phase and the V-phase changes as shown in FIG. 16 before and after the ON period of the first switching element 1U is shifted.

In the power converter 100 according to the second variation of the first embodiment, the variation and polarity tendency of the line voltage (U-V line voltage) between two out of the multiple phases change depending on whether the controller 50 performs the first control mode or the second control mode. That is why if the controller 50 performs only the first control mode or only the second control mode, a bias would be caused in the pattern of variation in the line voltage. In contrast, the power converter 100 according to the second variation would reduce such a bias that would be caused in the variation pattern of the line voltage compared to a situation where only one control mode is performed.

(Third Variation of First Embodiment)

A power converter 100 according to a third variation of the first embodiment has the same circuit configuration as the power converter 100 according to the first embodiment (refer to FIG. 1), and therefore, illustration of its circuit diagram is omitted. Next, it will be described with reference to FIGS. 1, 17, and 18 how the power converter 100 according to the third variation of the first embodiment operates.

In the power converter 100 according to the third variation of the first embodiment, as well as the power converter 100 according to the first embodiment described above, when determining that two-phase resonant currents corresponding to two switching circuits 10 belonging to the plurality of switching circuits 10 flow simultaneously through the resonant inductor L1, the controller 50 also performs control of shifting respective ON periods of the first switching element 1 and the second switching element 2 in one switching circuit 10 out of the two switching circuits 10. In this case, in the power converter 100 according to the third variation, the controller 50 shifts the respective ON periods of the first switching element 1 and the second switching element 2 for a maximum shift time Tshift_uv_max within one cycle of the carrier signal. The "maximum shift time" varies as follows depending on the shift direction of the PWM signal. If the shift direction is a direction in which the ON periods are postponed on the time axis, then the "maximum shift time" herein refers to a shift time that makes the time lag between the end of one cycle of the carrier signal and the end of the high-level period of the PWM signal shifted either a predetermined amount of time or zero. On the other hand, if the shift direction of the PWM signal is a direction in which the ON periods are advanced on the time axis, then the "maximum shift time" herein refers to a shift time that makes the time lag between the beginning of one cycle of the carrier signal and the beginning of the high-level period of the PWM signal shifted either a predetermined amount of time or zero.

Figure 17:
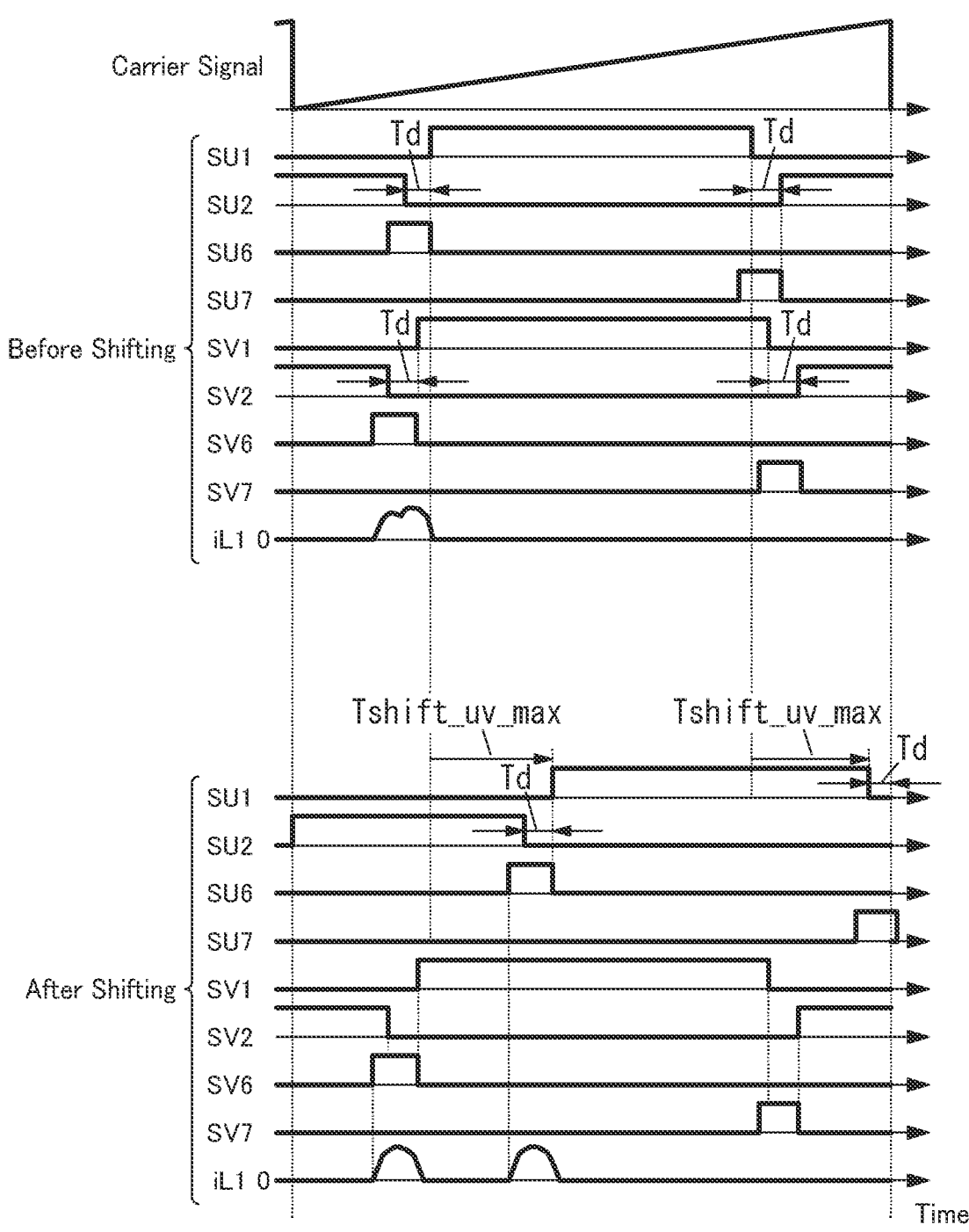
FIG. 17 is a timing chart illustrating how a power converter according to a second variation of the first embodiment operates.

As an example, the upper portion of FIG. 17 shows a timing chart of PWM signals SU1, SU2, SV1, SV2 that have not been shifted yet, the control signals SU6, SU7, SV6, SV7, and a current iL1 in a situation where the controller 50 has determined that two-phase resonant currents (namely, U-phase and V-phase resonant currents) flow simultaneously in the period corresponding to the range A1 shown in FIG. 4. On the other hand, the lower portion of FIG. 17 shows a timing chart of PWM signals SU1, SU2, SV1, SV2, the control signals SU6, SU7, SV6, SV7, and the current iL1 in a situation where each of the PWM signal SU1 and PWM signal SU2 has been shifted for the maximum shift time Tshift_uv_max. In this example, the predetermined time is set as the same period of time as the dead time Td.

The power converter 100 according to the third variation of the first embodiment, as well as the power converter 100 according to the first embodiment, may reduce the chances of two-phase resonant currents flowing simultaneously through the resonant inductor L1 in the period corresponding to the range A1 shown in FIG. 4, thus enabling making soft switching (zero-voltage soft switching). In addition, the power converter 100 according to the third variation may make the period in which the resonant current flows through the resonant inductor L1 more dispersed than in the power converter 100 according to the first embodiment, thus enabling lightening a thermal load on the resonant inductor L1.

In the power converter 100 according to the third variation, when the controller 50 shifts the respective ON periods of the first switching element 1 and the second switching element 2 in the one switching circuit 10 in a predetermined direction (i.e., a direction in which the ON periods are postponed on the time axis) in the period corresponding to the range A1 shown in FIG. 4, the predetermined direction is supposed to be a direction in which the ON periods are postponed on the time axis. However, this is only an example and should not be construed as limiting. Alternatively, the predetermined direction may also be a direction in which the ON periods are advanced on the time axis as in the first variation described above. Optionally, the shift time may also be set at any other amount of time shorter than the maximum shift time, as long as the shift time is not greater than the maximum shift time.

Figure 18:
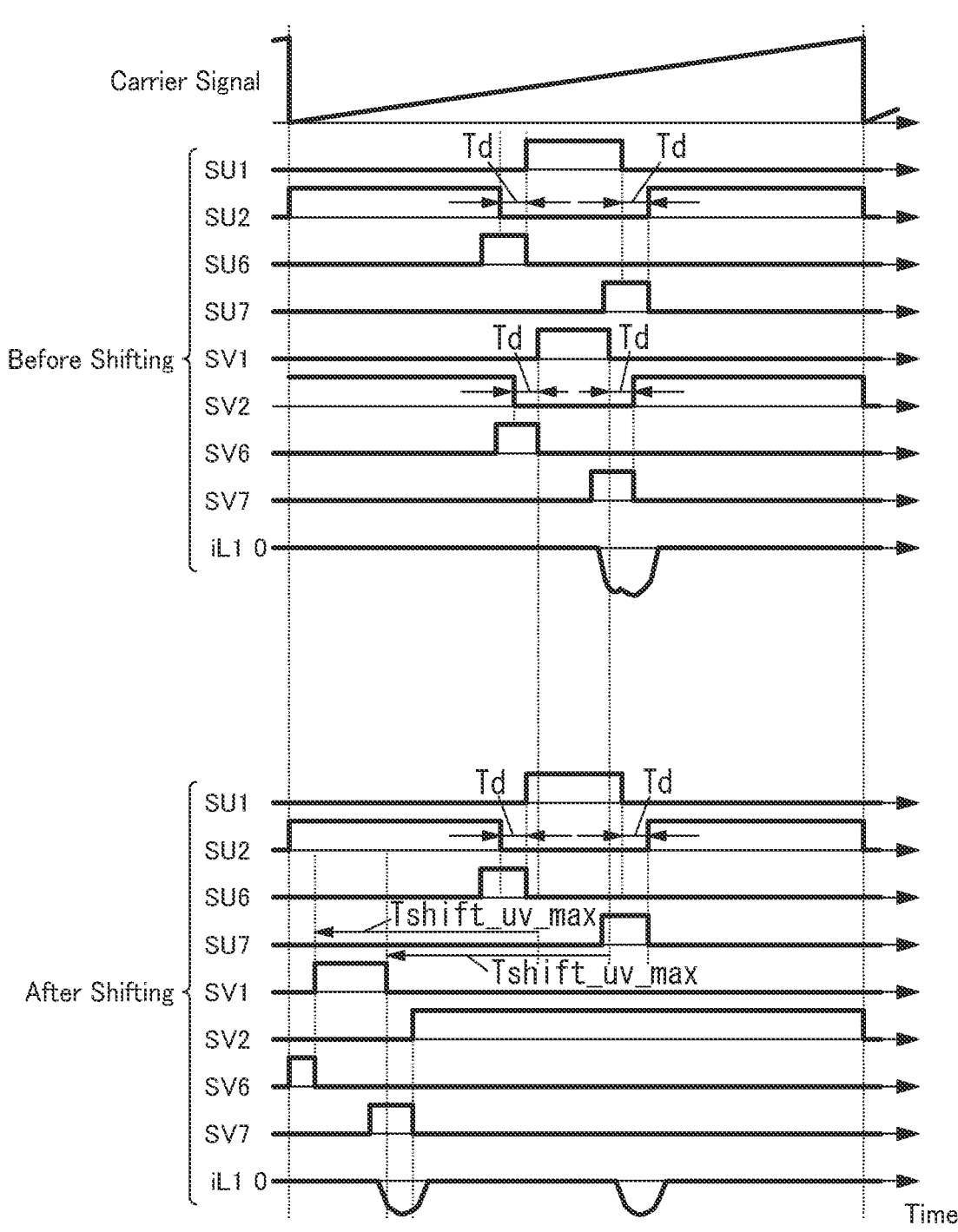
FIG. 18 is a timing chart illustrating how the power converter operates.

The upper portion of FIG. 18 shows a timing chart of PWM signals SU1, SU2, SV1, SV2 that have not been shifted yet, the control signals SU6, SU7, SV6, SV7, and a current iL1 in a situation where the controller 50 has determined that two-phase resonant currents (namely, U-phase and V-phase resonant currents) flow simultaneously in the period corresponding to the range A2 shown in FIG. 4. On the other hand, the lower portion of FIG. 18 shows a timing chart of PWM signals SU1, SU2, SV1, SV2, the control signals SU6, SU7, SV6, SV7, and the current iL1 in a situation where each of the PWM signal SV1 and PWM signal SV2 has been shifted for the maximum shift time Tshift_uv_max.

The power converter 100 according to the third variation of the first embodiment, as well as the power converter 100 according to the first embodiment, may reduce the chances of two-phase resonant currents flowing simultaneously through the resonant inductor L1 in the period corresponding to the range A2 shown in FIG. 4, thus enabling making soft switching (zero-voltage soft switching). In addition, the power converter 100 according to the third variation may also make the period in which the resonant current flows through the resonant inductor L1 more dispersed than in the power converter 100 according to the first embodiment, thus enabling lightening a thermal load on the resonant inductor L1.

In the power converter 100 according to the third variation, when the controller 50 shifts the respective ON periods of the first switching element 1 and the second switching element 2 in the one switching circuit 10 in a predetermined direction in the period corresponding to the range A2 shown in FIG. 4, the predetermined direction is supposed to be a direction in which the ON periods are advanced on the time axis. However, this is only an example and should not be construed as limiting. Alternatively, the predetermined direction may also be a direction in which the ON periods are postposed on the time axis as in the first variation described above. Optionally, the shift time may also be set at any other amount of time shorter than the maximum shift time, as long as the shift time is not greater than the maximum shift time.

(Fourth Variation of First Embodiment)

A power converter 100 according to a fourth variation of the first embodiment has the same circuit configuration as the power converter 100 (refer to FIG. 1) according to the first embodiment, and therefore, illustration of its circuit diagram is omitted. Next, it will be described with reference to FIGS. 1, 19, and 20 how the power converter 100 according to the fourth variation of the first embodiment operates.

In the power converter 100 according to the fourth variation of the first embodiment, as well as the power converter 100 according to the first embodiment described above, when determining that two-phase resonant currents corresponding to two switching circuits 10 belonging to the plurality of switching circuits 10 flow simultaneously through the resonant inductor L1, the controller 50 also performs control of shifting respective ON periods of the first switching element 1 and the second switching element 2 in one switching circuit 10 out of the two switching circuits 10.

In the power converter 100 according to the first embodiment, using, as the one switching circuit 10, one of the two switching circuits 10, of which the first switching element 1 is associated with a PWM signal with the smaller duty, the controller 50 performs the control of shifting the respective ON periods of the first switching element 1 and the second switching element 2 in the one switching circuit 10 for a predetermined period Tshift_uv. On the other hand, in the power converter 100 according to the fourth variation, using, as the one switching circuit 10, one of the two switching circuits 10, of which the first switching element 1 is associated with a PWM signal with the larger duty, the controller 50 performs the control of shifting the respective ON periods of the first switching element 1 and the second switching element 2 in the one switching circuit 10. Note that if the controller 50 performs, using, as the one switching circuit 10, one of the two switching circuits 10, of which the first switching element 1 is associated with a PWM signal with the smaller duty, the control of shifting the respective ON periods of the first switching element 1 and the second switching element 2 in the one switching circuit 10 as in the first embodiment, then the amount of time of shifting the ON period within one cycle of the carrier signal may be determined with a higher degree of freedom than in the fourth variation.

Figure 19:
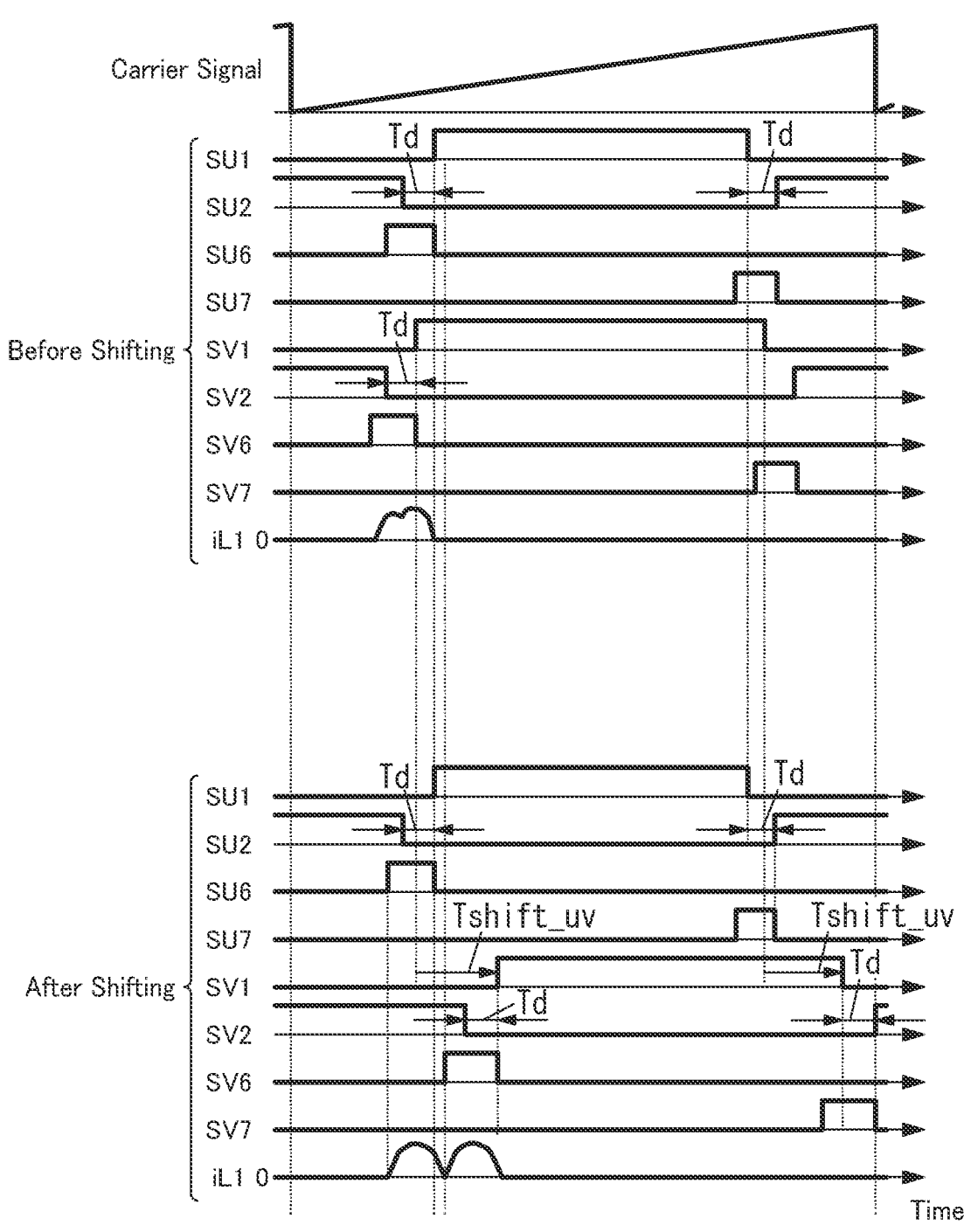
FIG. 19 is a timing chart illustrating how a power converter according to a third variation of the first embodiment operates.

As an example, the upper portion of FIG. 19 shows a timing chart of PWM signals SU1, SU2, SV1, SV2 that have not been shifted yet, the control signals SU6, SU7, SV6, SV7, and a current iL1 in a situation where the controller 50 has determined that two-phase resonant currents (namely, U-phase and V-phase resonant currents) flow simultaneously in the period corresponding to the range A1 shown in FIG. 4. On the other hand, the lower portion of FIG. 19 shows a timing chart of PWM signals SU1, SU2, SV1, SV2, the control signals SU6, SU7, SV6, SV7, and the current iL1 in a situation where the PWM signal SV1 has been shifted for the shift time. In the power converter 100 according to the fourth variation, when the controller 50 shifts the respective ON periods of the first switching element 1 and the second switching element 2 in the one switching circuit 10 in a predetermined direction in the period corresponding to the range A1 shown in FIG. 4, the predetermined direction is supposed to be a direction in which the ON periods are postponed on the time axis. However, this is only an example and should not be construed as limiting. Alternatively, the predetermined direction may also be a direction in which the ON periods are advanced on the time axis as in the first variation described above.

Figure 20:
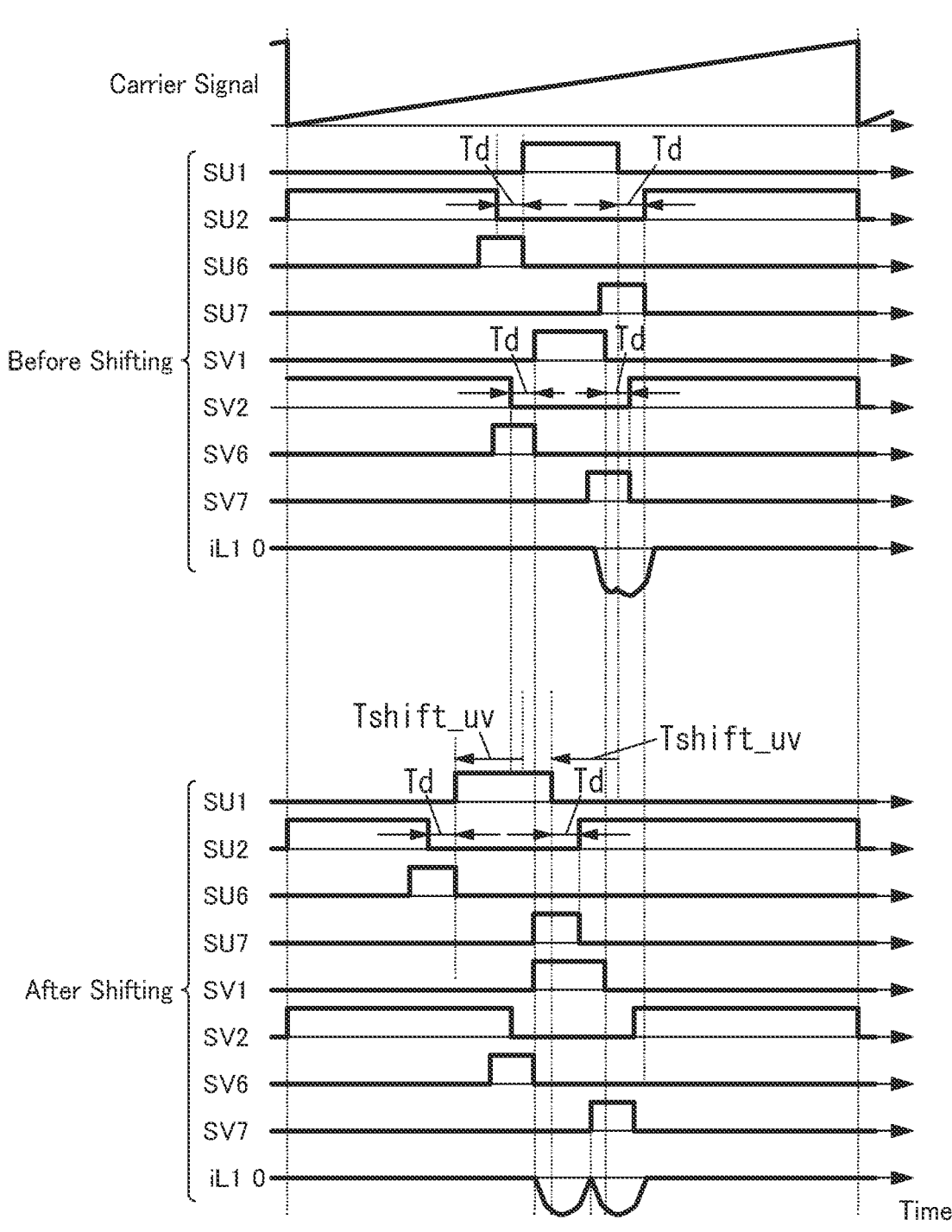
FIG. 20 is a timing chart illustrating how the power converter operates.

Also, the upper portion of FIG. 20 shows a timing chart of PWM signals SU1, SU2, SV1, SV2 that have not been shifted yet, the control signals SU6, SU7, SV6, SV7, and a current iL1 in a situation where the controller 50 has determined that two-phase resonant currents (namely, U-phase and V-phase resonant currents) flow simultaneously in the period corresponding to the range A2 shown in FIG. 4. On the other hand, the lower portion of FIG. 20 shows a timing chart of PWM signals SU1, SU2, SV1, SV2, the control signals SU6, SU7, SV6, SV7, and the current iL1 in a situation where the PWM signal SU1 has been shifted for the shift time. In the power converter 100 according to the fourth variation, when the controller 50 shifts the respective ON periods of the first switching element 1 and the second switching element 2 in the one switching circuit 10 in a predetermined direction in the period corresponding to the range A2 shown in FIG. 4, the predetermined direction is supposed to be a direction in which the ON periods are advanced on the time axis. However, this is only an example and should not be construed as limiting. Alternatively, the predetermined direction may also be a direction in which the ON periods are postponed on the time axis as in the first variation described above.

The power converter 100 according to the fourth variation of the first embodiment, as well as the power converter 100 according to the first embodiment, may reduce the chances of two-phase resonant currents flowing simultaneously through the resonant inductor L1, thus enabling making soft switching (zero-voltage soft switching).

Second Embodiment

Next, a power converter 100a according to a second embodiment will be described with reference to FIG. 21. The power converter 100a according to the second embodiment further includes a capacitor C9 connected between the second terminal of the resonant inductor L1 and the first DC terminal 31, which is a difference from the power converter 100 (refer to FIG. 1) according to the first embodiment. In the following description, any constituent element of the power converter 100a according to this second embodiment, having the same function as a counterpart of the power converter 100 according to the first embodiment described above, will be designated by the same reference numeral as that counterpart's, and description thereof will be omitted herein.

The power converter 100a does not include the capacitor C10 of the power converter 100 according to the first embodiment. The capacitor C9 is connected to the capacitor C1 in series. Thus, in the power converter 100a, a series circuit of the capacitors C9 and C1 is connected between the first DC terminal 31 and the second DC terminal 32. The capacitance of the capacitor C9 is the same as the capacitance of the capacitor C1. As used herein, the expression "the capacitance of the capacitor C9 is the same as the capacitance of the capacitor C10" refers to not only a situation where the capacitance of the capacitor C9 is exactly the same as the capacitance of the capacitor C1 but also a situation where the capacitance of the capacitor C9 falls within the range from 95% to 105% of the capacitance of the capacitor C1.

In the power converter 100a according to the second embodiment, the voltage V1 across the capacitor C1 is obtained by dividing the output voltage of the DC power supply E1 by the number of the capacitors C9 and C1. Thus, the voltage V1 across the capacitor C1 will be a half of the output voltage of the DC power supply E1. In the power converter 100a according to the second embodiment, the controller 50 may store in advance the value of the voltage V1 across the capacitor C1.

In addition, in the power converter 100a according to the second embodiment, the plurality of switches 8 has a different configuration from the plurality of switches 8 of the power converter 100 according to the first embodiment. Specifically, in each of the plurality of switches 8 of the power converter 100a according to the second embodiment, the first IGBT 6 and the second IGBT 7 thereof are connected in anti-series. In each of the plurality of switches 8, the emitter terminal of the first IGBT 6 and the emitter terminal of the second IGBT 7 are connected to each other. In addition, each of the plurality of switches 8 further includes a diode 61 connected to the first IGBT 6 in anti-parallel and a diode 71 connected to the second IGBT 7 in anti-parallel. In each of the plurality of switches 8, the collector terminal of the first IGBT 6 is connected to the common connection node 25. In each of the plurality of switches 8, the collector terminal of the second IGBT 7 is connected to the connection node 3 of a switching circuit 10 corresponding to the switch 8 including the second IGBT 7. The switch 8U is connected to the connection node 3U between the first switching element 1U and the second switching element 2U. The switch 8V is connected to the connection node 3V between the first switching element 1V and the second switching element 2V. The switch 8W is connected to the connection node 3W between the first switching element 1W and the second switching element 2W.

In the power converter 100a according to the second embodiment, as well as the power converter 100 according to the first embodiment described above, when determining that two-phase resonant currents corresponding to two switching circuits 10 belonging to the plurality of switching circuits 10 flow simultaneously through the resonant inductor L1, the controller 50 also performs control of shifting respective ON periods of the first switching element 1 and the second switching element 2 in one switching circuit 10 out of the two switching circuits 10. This allows the power converter 100a according to the second embodiment, as well as the power converter 100 according to the first embodiment, to reduce the chances of two-phase resonant currents flowing simultaneously through the resonant inductor L1, thus enabling making soft switching (zero-voltage soft switching).

Figure 21:
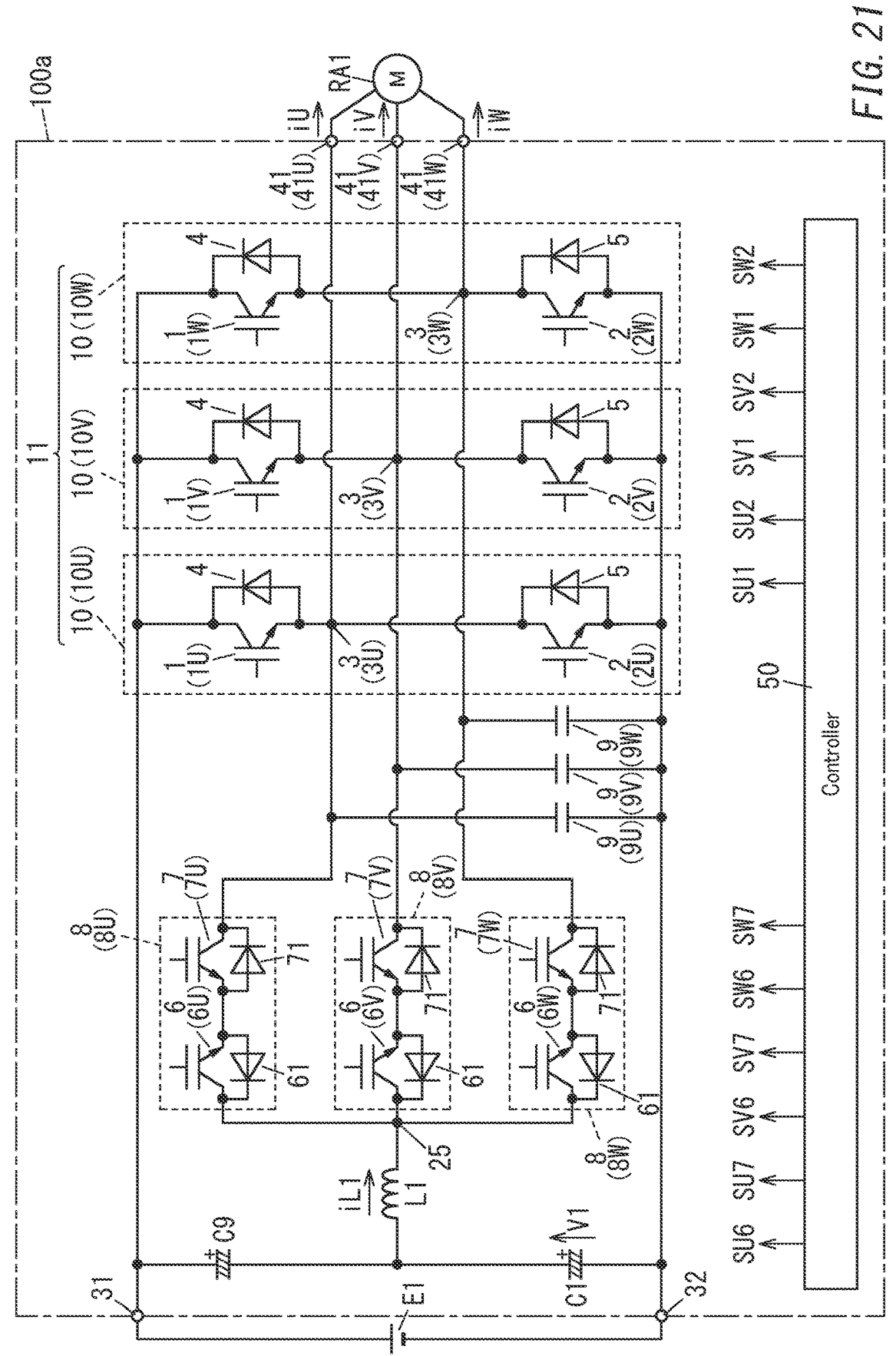
FIG. 21 is a circuit diagram of a power converter according to a second embodiment.
Figure 22:
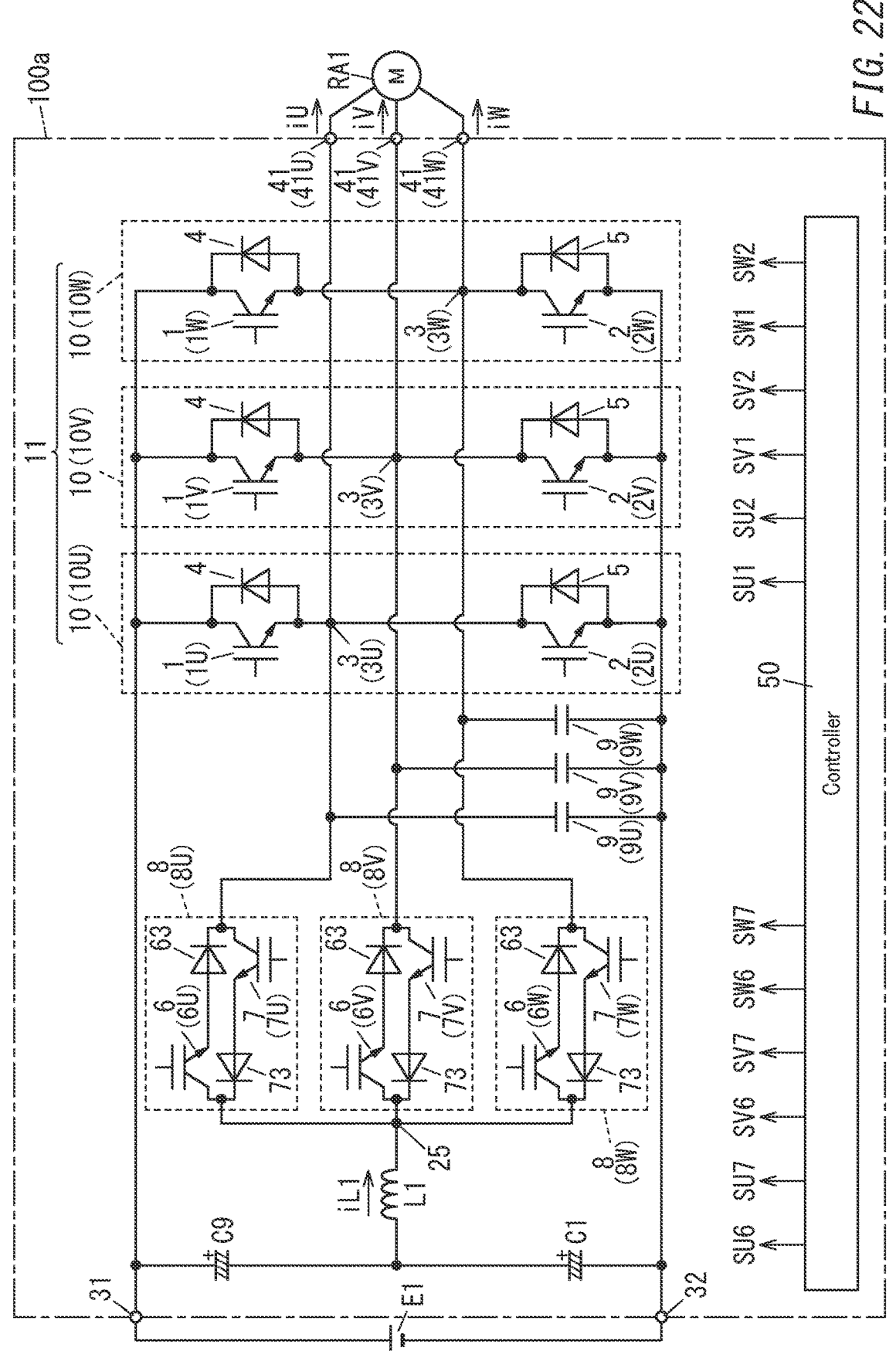
FIG. 22 is a circuit diagram illustrating another configuration for switches in the power converter according to the second embodiment.
Figure 23:
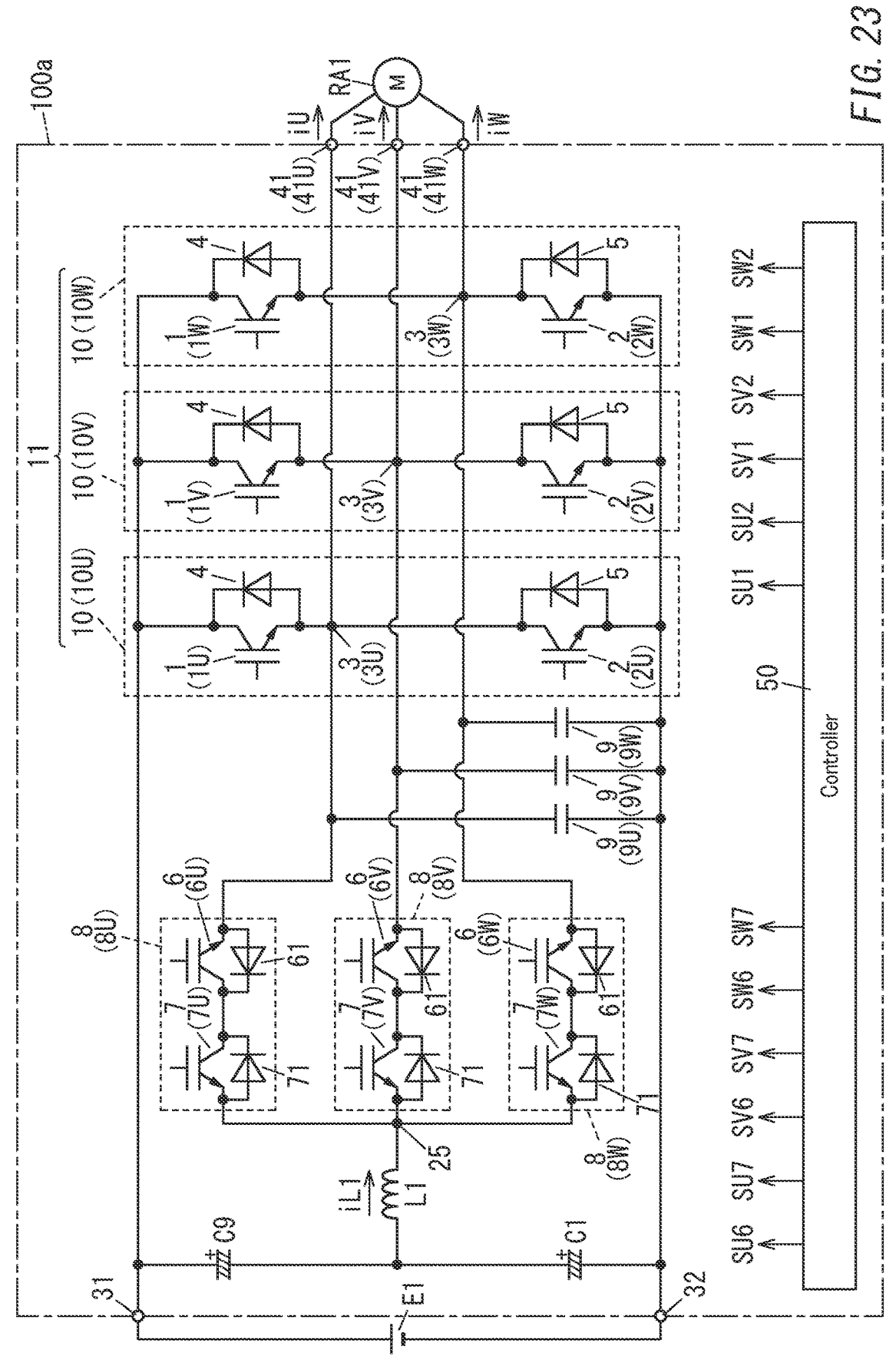
FIG. 23 is a circuit diagram illustrating still another configuration for switches in the power converter according to the second embodiment.

In the power converter 100a according to the second embodiment, each of the plurality of switches 8 does not have to have the configuration shown in FIG. 21 but may also have either the configuration shown in FIG. 22 or the configuration shown in FIG. 23. In FIG. 22, in each of the plurality of switches 8, a diode 63 is connected to the first IGBT 6 in series and a diode 73 is connected to the second IGBT 7 in series. In FIG. 22, the series circuit of the first IGBT 6 and the diode 63 and the series circuit of the second IGBT 7 and the diode 73 are connected in anti-parallel. According to the example shown in FIG. 22, providing the diodes 63 and 73 for each of the plurality of switches 8 may prevent a reverse bias voltage from being directly applied to any of the first IGBT 6 or the second IGBT 7, thus reducing the chances of causing a decline in the characteristics of the first IGBT 6 and second IGBT 7 due to the application of the reverse bias voltage. In FIG. 23, in each of the plurality of switches 8, the collector terminal of the first IGBT 6 and the collector terminal of the second IGBT 7 are connected to each other. Optionally, in any of the configurations shown in FIGS. 21, 22, and 23, each of the first IGBT 6 and the second IGBT 7 may be replaced with a MOSFET (metal-oxide semiconductor field effect transistor) or a bipolar transistor. In that case, the diodes 61 and 71 shown in FIGS. 21 and 23 may each be replaced with a parasitic diode of the substitute element (which may be either a MOSFET or a bipolar transistor) or an element built in a single chip of the substituent element (which may be either a MOSFET or a bipolar transistor). Furthermore, in FIGS. 21 and 23, the diodes 61, 71 do not have to be connected as separate elements to the first IGBT 6 and the second IGBT 7, respectively. Alternatively, the diode 61 and the first IGBT 6 may also be a single element built in one chip and the diode 71 and the second IGBT 7 may also be a single element built in one chip.

Third Embodiment

Figure 24:
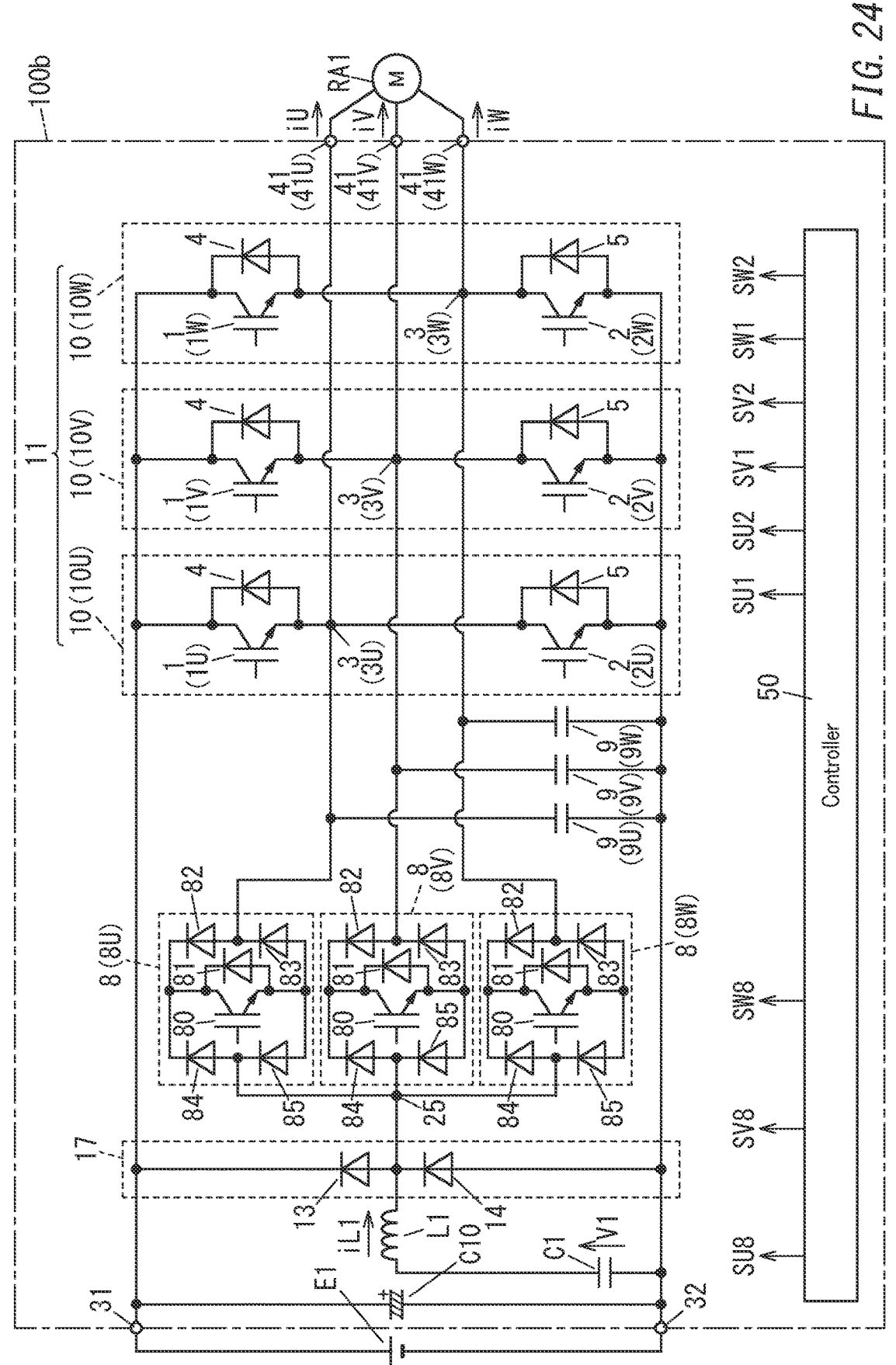
FIG. 24 is a circuit diagram of a power converter according to a third embodiment.

Next, a power converter 100b according to a third embodiment will be described with reference to FIG. 24. In the power converter 100b according to the third embodiment, the plurality of switches 8 has a different configuration from the plurality of switches 8 in the power converter 100 according to the first embodiment (refer to FIG. 1). In the following description, any constituent element of the power converter 100b according to this third embodiment, having the same function as a counterpart of the power converter 100 according to the first embodiment described above, will be designated by the same reference numeral as that counterpart's, and description thereof will be omitted herein.

In the power converter 100b, each of the plurality of switches 8 includes: a single IGBT 80; a diode 81 connected to the IGBT 80 in anti-parallel; a series circuit of two diodes 82, 83 which are connected to the IGBT 80 in anti-parallel; and a series circuit of two diodes 84, 85 which are connected to the IGBT 80 in anti-parallel. In each of the plurality of switches 8, the connection node between the diodes 82 and 83 (i.e., the first terminal of the switch 8) of the switch 8 is connected to the connection node 3 of a corresponding switching circuit 10 belonging to the plurality of switching circuits 10 and the connection node between the diodes 84 and 85 (i.e., the second terminal of the switch 8) is connected to the common connection node 25. In each of the plurality of switches 8, when the IGBT 80 is ON, the switch 8 is ON. When the IGBT 80 is OFF, the switch 8 is OFF.

The respective IGBTs 80 of the plurality of switches 8 are controlled by the controller 50. The controller 50 outputs a control signal SU8 for controlling the ON/OFF states of the IGBT 80 of the switch 8U, a control signal SV8 for controlling the ON/OFF states of the IGBT 80 of the switch 8V, and a control signal SW8 for controlling the ON/OFF states of the IGBT 80 of the switch 8W.

When the IGBT 80 is ON, a resonant current, produced by a resonant circuit including the resonant inductor L1 and the resonant capacitor 9, flows through the switch 8. In this power converter 100b, when one of the plurality of switches 8 is ON, a charging current including the resonant current flows along the path passing through the capacitor C1, the resonant inductor L1, the diode 84, the IGBT 80, the diode 83, and the resonant capacitor 9 in this order. In addition, in this power converter 100b, when one of the plurality of switches 8 is ON, a discharging current including the resonant current flows along the path passing through the resonant capacitor 9, the diode 82, the IGBT 80, the diode 85, the resonant inductor L1, and the capacitor C1 in this order.

In the power converter 100a according to the third embodiment, as well as the power converter 100 according to the first embodiment described above, when determining that two-phase resonant currents corresponding to two switching circuits 10 belonging to the plurality of switching circuits 10 flow simultaneously through the resonant inductor L1, the controller 50 also performs control of shifting respective ON periods of the first switching element 1 and the second switching element 2 in one switching circuit 10 out of the two switching circuits 10. This allows the power converter 100b according to the third embodiment, as well as the power converter 100 according to the first embodiment, to reduce the chances of two-phase resonant currents flowing simultaneously through the resonant inductor L1, thus enabling making soft switching (zero-voltage soft switching). In FIG. 24, each IGBT 80 may be replaced with a MOSFET. In that case, each of the plurality of diodes 81 may be replaced with, for example, a parasitic diode of a corresponding MOSFET. Alternatively, in FIG. 24, each IGBT 80 may also be, for example, a bipolar transistor or GaN-based gate injection transistor (GIT).

Fourth Embodiment

Figure 25:
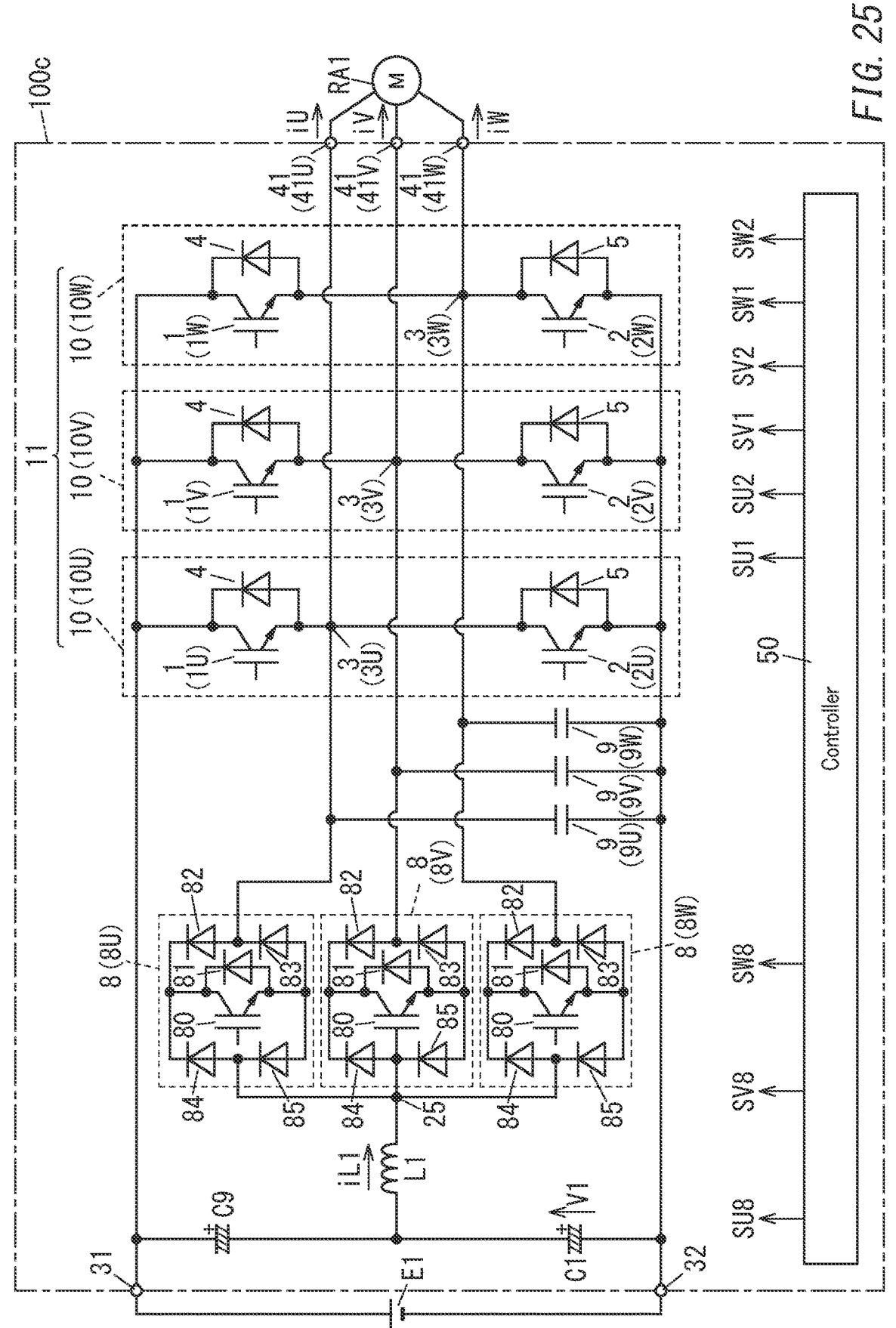
FIG. 25 is a circuit diagram of a power converter according to a fourth embodiment.

Next, a power converter 100c according to a fourth embodiment will be described with reference to FIG. 25. The power converter 100c according to the fourth embodiment further includes a capacitor C9 connected between the second terminal of the resonant inductor L1 and the first DC terminal 31, which is a difference from the power converter 100b according to the third embodiment (refer to FIG. 24). In the following description, any constituent element of the power converter 100c according to this fourth embodiment, having the same function as a counterpart of the power converter 100b according to the third embodiment described above, will be designated by the same reference numeral as that counterpart's, and description thereof will be omitted herein.

The power converter 100c does not include the capacitor C10 of the power converter 100b according to the third embodiment. The capacitor C9 is connected to the capacitor C1 in series. Thus, in the power converter 100c, a series circuit of the capacitors C9 and C1 is connected between the first DC terminal 31 and the second DC terminal 32. The capacitance of the capacitor C9 is the same as the capacitance of the capacitor C1. As used herein, the expression "the capacitance of the capacitor C9 is the same as the capacitance of the capacitor C1" refers to not only a situation where the capacitance of the capacitor C9 is exactly the same as the capacitance of the capacitor C1 but also a situation where the capacitance of the capacitor C9 falls within the range from 95% to 105% of the capacitance of the capacitor C1.

In the power converter 100c according to the fourth embodiment, the voltage V1 across the capacitor C1 is obtained by dividing the output voltage of the DC power supply E1 by the number of the capacitors C9 and C1. Thus, the voltage V1 across the capacitor C1 will be a half of the output voltage of the DC power supply E1. In the power converter 100c according to the fourth embodiment, the controller 50 may store in advance the value of the voltage V1 across the capacitor C1.

In the power converter 100c according to the fourth embodiment, as well as the power converter 100b according to the third embodiment described above, when determining that two-phase resonant currents corresponding to two switching circuits 10 belonging to the plurality of switching circuits 10 flow simultaneously through the resonant inductor L1, the controller 50 also performs control of shifting respective ON periods of the first switching element 1 and the second switching element 2 in one switching circuit 10 out of the two switching circuits 10. This allows the power converter 100c according to the fourth embodiment, as well as the power converter 100b according to the third embodiment, to reduce the chances of two-phase resonant currents flowing simultaneously through the resonant inductor L1, thus enabling making soft switching (zero-voltage soft switching). In FIG. 25, each IGBT 80 may be replaced with a MOSFET. In that case, each of the plurality of diodes 81 may be replaced with, for example, a parasitic diode of a corresponding MOSFET. Alternatively, in FIG. 25, each IGBT 80 may also be, for example, a bipolar transistor or GaN-based GIT.

(Other Variations)

Note that the first to fourth embodiments and their variations described above are only exemplary ones of various embodiments of the present disclosure and their variations and should not be construed as limiting. Rather, the first to fourth exemplary embodiments and their variations may be readily modified in various manners depending on a design choice or any other factor without departing from the scope of the present disclosure.

For example, when determining that two-phase resonant currents flow simultaneously through the resonant inductor L1, the controller 50 may perform the control of shifting the respective ON periods of the first switching element 1 and the second switching element 2 in the one switching circuit 10 for the same predetermined period. In addition, the controller 50 may also be configured, for example, to have the respective control modes performed in an arbitrary combination and at an arbitrary ratio by the power converter 100 according to the first embodiment, the power converters

100 according to the first to fourth variations of the first embodiment, and the power converters 100a-100c according to the second, third, and fourth embodiments.

Furthermore, each of the plurality of first switching elements 1 and the plurality of second switching elements 2 does not have to be an IGBT but may also be a MOSFET. In that case, each of the plurality of first diodes 4 may also be replaced with, for example, a parasitic diode of a MOSFET serving as its corresponding first switching element 1. In addition, each of the plurality of second diodes 5 may also be replaced with, for example, a parasitic diode of a MOSFET serving as its corresponding second switching element 2. The MOSFET may be, for example, an Si-based MOSFET or an SiC-based MOSFET. Each of the plurality of first switching elements 1 and the plurality of second switching elements 2 may also be, for example, a bipolar transistor or a GaN-based GIT.

Furthermore, each of the plurality of switches 8 does not have to have one of the configurations described for the first to fourth embodiments but may also have any other configuration as long as the switch 8 may perform the function of a bidirectional switch. For example, each switch 8 may also have a configuration in which two MOSFETs are connected in anti-parallel or a configuration in which two MOSFETs are connected in anti-series. Still alternatively, each switch 8 may also be a dual-gate GaN-based GIT or a bidirectional thyristor.

Optionally, in the power converters 100, 100a, 100b, 100c, if each of the plurality of resonant capacitors 9 has a relatively small capacitance, then the parasitic capacitors across the plurality of second switching elements 2 may also serve as the plurality of resonant capacitors 9 instead of connecting the plurality of resonant capacitors 9 as separate elements.

(Aspects)

The first to fourth embodiments and their variations described above are specific implementations of the following aspects of the present disclosure.

A power converter (100; 100a; 100b; 100c) according to a first aspect includes a first DC terminal (31) and a second DC terminal (32), a power converter circuit (11), a plurality of (e.g., three) AC terminals (41), a plurality of switches (8), a plurality of resonant capacitors (9), a resonant inductor (L1), a capacitor (C1), and a controller (50). The power converter circuit (11) includes a plurality of first switching elements (1) and a plurality of second switching elements (2). In the power converter circuit (11), a plurality of switching circuits (10), in each of which one of the plurality of first switching elements (1) and a corresponding one of the plurality of second switching elements (2) are connected one to one in series, are connected in parallel. In the power converter circuit (11), the plurality of first switching elements (1) are connected to the first DC terminal (31) and the plurality of second switching elements (2) are connected to the second DC terminal (32). The plurality of AC terminals (41) are provided one to one for the plurality of switching circuits (10), respectively. Each of the plurality of AC terminals (41) is connected to a connection node (3) between the first switching element (1) and the second switching element (2) of a corresponding one of the plurality of switching circuits (10). The plurality of switches (8) are provided one to one for the plurality of switching circuits (10). Each of the plurality of switches (8) has a first terminal thereof connected to the connection node (3) between the first switching element (1) and the second switching element (2) of a corresponding one of the plurality of switching circuits (10). The plurality of switches (8) have their respective second terminals connected in common to a common connection node (25). The resonant inductor (L1) has a first terminal and a second terminal. The plurality of resonant capacitors (9) are provided one to one for the plurality of switches (8), respectively. Each of the plurality of resonant capacitors (9) is connected between the first terminal of a corresponding one of the plurality of switches (8) and the second DC terminal (32). In the resonant inductor (L1), the first terminal of the resonant inductor (L1) is connected to the common connection node (25). The capacitor (C1) is connected between the second terminal of the resonant inductor (L1) and the second DC terminal (32). The controller (50) controls the plurality of first switching elements (1), the plurality of second switching elements (2), and the plurality of switches (8). When determining that two-phase resonant currents corresponding to two switching circuits (10) belonging to the plurality of switching circuits (10) flow simultaneously through the resonant inductor (L1), the controller (50) performs control of shifting respective ON periods of the first switching element (1) and the second switching element (2) in one switching circuit (10) out of the two switching circuits (10).

A power converter (100; 100*a*; 100*b*; 100*c*) according to the first aspect enables making soft switching with more reliability.

In a power converter (100; 100*a*; 100*b*; 100*c*) according to a second aspect, which may be implemented in conjunction with the first aspect, the controller (50) performs, when determining that the two-phase resonant currents flow simultaneously through the resonant inductor (L1), control of shifting, for a predetermined period, respective ON periods of the first switching element (1) and the second switching element (2) in the one switching circuit (10).

In a power converter (100; 100*a*; 100*b*; 100*c*) according to a third aspect, which may be implemented in conjunction with the first or second aspect, the controller (50) performs, when determining that the two-phase resonant currents flow simultaneously through the resonant inductor (L1), control of shifting, in a predetermined direction, respective ON periods of the first switching element (1) and the second switching element (2) in the one switching circuit (10).

In a power converter (100; 100*a*; 100*b*; 100*c*) according to a fourth aspect, which may be implemented in conjunction with any one of the first to third aspects, the controller (50) performs, when determining that the two-phase resonant currents flow simultaneously through the resonant inductor (L1), control of shifting respective ON periods of the first switching element (1) and the second switching element (2) in the one switching circuit (10) by regarding, as the one switching circuit (10), one of the two switching circuits (10) in which a PWM signal associated with the first switching element (1) has the smaller duty.

A power converter (100; 100*a*; 100*b*; 100*c*) according to the fourth aspect allows the amount of time, for which the ON period is shifted, to be determined with an increased degree of freedom.

In a power converter (100; 100*a*; 100*b*; 100*c*) according to a fifth aspect, which may be implemented in conjunction with any one of the first to fourth aspects, parasitic capacitances across the plurality of second switching elements (2) also serve as the plurality of resonant capacitors (9).

A power converter (100; 100*a*; 100*b*; 100*c*) according to the fifth aspect contributes to cutting down the cost by reducing the number of components required.

A control method according to a sixth aspect is a method for controlling a power converter. The power converter includes a first DC terminal (31) and a second DC terminal (32), a power converter circuit (11), a plurality of (e.g., three) AC terminals (41), a plurality of switches (8), a plurality of resonant capacitors (9), a resonant inductor (L1), and a capacitor (C1). The power converter circuit (11) includes a plurality of first switching elements (1) and a plurality of second switching elements (2). In the power converter circuit (11), a plurality of switching circuits (10), in each of which one of the plurality of first switching elements (1) and a corresponding one of the plurality of second switching elements (2) are connected one to one in series, are connected in parallel. In the power converter circuit (11), the plurality of first switching elements (1) are connected to the first DC terminal (31) and the plurality of second switching elements (2) are connected to the second DC terminal (32). The plurality of AC terminals (41) are provided one to one for the plurality of switching circuits (10), respectively. Each of the plurality of AC terminals (41) is connected to a connection node (3) between the first switching element (1) and the second switching element (2) of a corresponding one of the plurality of switching circuits (10). The plurality of switches (8) are provided one to one for the plurality of switching circuits (10). Each of the plurality of switches (8) has a first terminal thereof connected to the connection node (3) between the first switching element (1) and the second switching element (2) of a corresponding one of the plurality of switching circuits (10). The plurality of switches (8) have their respective second terminals connected in common to a common connection node (25). The plurality of resonant capacitors (9) are provided one to one for the plurality of switches (8), respectively. Each of the plurality of resonant capacitors (9) is connected between the first terminal of a corresponding one of the plurality of switches (8) and the second DC terminal (32). The resonant inductor (L1) has a first terminal and a second terminal. In the resonant inductor (L1), the first terminal of the resonant inductor (L1) is connected to the common connection node (25). The capacitor (C1) is connected between the second terminal of the resonant inductor (L1) and the second DC terminal (32). The control method includes a first step and a second step. The first step includes determining whether two-phase resonant currents corresponding to two switching circuits (10) belonging to the plurality of switching circuits (10) flow simultaneously through the resonant inductor (L1). The second step includes performing, when determining, in the first step, that the two-phase resonant currents flow simultaneously through the resonant inductor (L1), control of shifting respective ON periods of the first switching element (1) and the second switching element (2) in one switching circuit (10) out of the two switching circuits (10).

The control method according to the sixth aspect enables making soft switching with more reliability.

REFERENCE SIGNS LIST

1 First Switching Element
2 Second Switching Element
3 Connection Node
8 Switch
9 Resonant Capacitor
10 Switching Circuit
11 Power Converter Circuit
25 Common Connection Node
31 First DC Terminal
32 Second DC Terminal
41 AC Terminal
50 Controller 100, 100a, 100b, 100c Power Converter
C1 Capacitor
L1 Resonant Inductor

The invention claimed is:

1. A power converter comprising:
a first DC terminal and a second DC terminal;
a power converter circuit including a plurality of first switching elements and a plurality of second switching elements, the power converter circuit being implemented as a parallel connection of a plurality of switching circuits in each of which one of the plurality of first switching elements and a corresponding one of the plurality of second switching elements are connected one to one in series, the plurality of first switching elements being connected to the first DC terminal, the plurality of second switching elements being connected to the second DC terminal;
a plurality of AC terminals provided one to one for the plurality of switching circuits, respectively, each of the plurality of AC terminals being connected to a connection node between the first switching element and the second switching element of a corresponding one of the plurality of switching circuits;
a plurality of switches provided one to one for the plurality of switching circuits, each of the plurality of switches having a first terminal thereof connected to the connection node between the first switching element and the second switching element of a corresponding one of the plurality of switching circuits, the plurality of switches having their respective second terminals connected in common to a common connection node;
a plurality of resonant capacitors provided one to one for the plurality of switches, respectively, each of the plurality of resonant capacitors being connected between the first terminal of a corresponding one of the plurality of switches and the second DC terminal;
a resonant inductor having a first terminal and a second terminal, the first terminal of the resonant inductor being connected to the common connection node;
a capacitor connected between the second terminal of the resonant inductor and the second DC terminal; and
a controller configured to control the plurality of first switching elements, the plurality of second switching elements, and the plurality of switches,
the controller being configured to, when determining that two-phase resonant currents corresponding to two switching circuits belonging to the plurality of switching circuits flow simultaneously through the resonant inductor, perform control of shifting respective ON periods of the first switching element and the second switching element in one switching circuit out of the two switching circuits.

2. The power converter of claim 1, wherein
the controller is configured to, when determining that the two-phase resonant currents flow simultaneously through the resonant inductor, perform control of shifting, for a predetermined period, respective ON periods of the first switching element and the second switching element in the one switching circuit.

3. The power converter of claim 2, wherein
the controller is configured to, when determining that the two-phase resonant currents flow simultaneously through the resonant inductor, perform control of shifting, in a predetermined direction, respective ON periods of the first switching element and the second switching element in the one switching circuit.

4. The power converter of claim 2, wherein
the controller is configured to, when determining that the two-phase resonant currents flow simultaneously through the resonant inductor, perform control of shifting respective ON periods of the first switching element and the second switching element in the one switching circuit by regarding, as the one switching circuit, one of the two switching circuits in which a PWM signal associated with the first switching element has the smaller duty.

5. The power converter of claim 2, wherein
parasitic capacitances across the plurality of second switching elements also serve as the plurality of resonant capacitors.

6. The power converter of claim 1, wherein
the controller is configured to, when determining that the two-phase resonant currents flow simultaneously through the resonant inductor, perform control of shifting, in a predetermined direction, respective ON periods of the first switching element and the second switching element in the one switching circuit.

7. The power converter of claim 6, wherein
the controller is configured to, when determining that the two-phase resonant currents flow simultaneously through the resonant inductor, perform control of shifting respective ON periods of the first switching element and the second switching element in the one switching circuit by regarding, as the one switching circuit, one of the two switching circuits in which a PWM signal associated with the first switching element has the smaller duty.

8. The power converter of claim 6, wherein
parasitic capacitances across the plurality of second switching elements also serve as the plurality of resonant capacitors.

9. The power converter of claim 1, wherein
the controller is configured to, when determining that the two-phase resonant currents flow simultaneously through the resonant inductor, perform control of shifting respective ON periods of the first switching element and the second switching element in the one switching circuit by regarding, as the one switching circuit, one of the two switching circuits in which a PWM signal associated with the first switching element has the smaller duty.

10. The power converter of claim 9, wherein
parasitic capacitances across the plurality of second switching elements also serve as the plurality of resonant capacitors.

11. The power converter of claim 1, wherein
parasitic capacitances across the plurality of second switching elements also serve as the plurality of resonant capacitors.

12. A method for controlling a power converter, the power converter including:
a first DC terminal and a second DC terminal;
a power converter circuit including a plurality of first switching elements and a plurality of second switching elements, the power converter circuit being implemented as a parallel connection of a plurality of switching circuits in each of which one of the plurality of first switching elements and a corresponding one of the plurality of second switching elements are connected one to one in series, the plurality of first switching elements being connected to the first DC terminal, the plurality of second switching elements being connected to the second DC terminal;

a plurality of AC terminals provided one to one for the plurality of switching circuits, respectively, each of the plurality of AC terminals being connected to a connection node between the first switching element and the second switching element of a corresponding one of the plurality of switching circuits;

a plurality of switches provided one to one for the plurality of switching circuits, each of the plurality of switches having a first terminal thereof connected to the connection node between the first switching element and the second switching element of a corresponding one of the plurality of switching circuits, the plurality of switches having their respective second terminals connected in common to a common connection node;

a plurality of resonant capacitors provided one to one for the plurality of switches, respectively, each of the plurality of resonant capacitors being connected between the first terminal of a corresponding one of the plurality of switches and the second DC terminal;

a resonant inductor having a first terminal and a second terminal, the first terminal of the resonant inductor being connected to the common connection node; and a capacitor connected between the second terminal of the resonant inductor and the second DC terminal, the method comprising:

a first step including determining whether two-phase resonant currents corresponding to two switching circuits belonging to the plurality of switching circuits flow simultaneously through the resonant inductor; and a second step including performing, when determining, in the first step, that the two-phase resonant currents flow simultaneously through the resonant inductor, control of shifting respective ON periods of the first switching element and the second switching element in one switching circuit out of the two switching circuits.

* * * * *